United States Patent
Satake et al.

(10) Patent No.: US 8,807,757 B2
(45) Date of Patent: Aug. 19, 2014

(54) MOBILE ELECTRONIC DEVICE HAVING A PARTIAL IMAGE PROJECTOR

(75) Inventors: Kanji Satake, Yokohama (JP); Hajime Okumura, Yokohama (JP)

(73) Assignee: Kyocera Corporation, Kyoto (JP)

( * ) Notice: Subject to any disclaimer, the term of this patent is extended or adjusted under 35 U.S.C. 154(b) by 327 days.

(21) Appl. No.: 13/322,539

(22) PCT Filed: May 26, 2010

(86) PCT No.: PCT/JP2010/058931
§ 371 (c)(1),
(2), (4) Date: Nov. 25, 2011

(87) PCT Pub. No.: WO2010/137626
PCT Pub. Date: Dec. 2, 2010

(65) Prior Publication Data
US 2012/0069308 A1    Mar. 22, 2012

(30) Foreign Application Priority Data
May 27, 2009   (JP) .................................. 2009-128299

(51) Int. Cl.
G03B 21/00 (2006.01)
G03B 21/30 (2006.01)
H04N 9/31 (2006.01)
H04N 1/387 (2006.01)

(52) U.S. Cl.
CPC .............. *G03B 21/30* (2013.01); *H04N 9/3147* (2013.01); *H04N 9/3173* (2013.01); *H04N 1/3876* (2013.01); *G03B 21/005* (2013.01)
USPC ................... 353/31; 353/30; 353/94; 353/119

(58) Field of Classification Search
CPC .............. G03B 21/005–21/006; G03B 21/008; G03B 21/134; G03B 21/30; H04N 1/387; H04N 1/3876; H04N 9/3147; H04N 9/3173; H04N 9/3197; G09F 19/18
USPC ........... 353/30–31, 34, 36–37, 39, 48, 82, 94, 353/119, 122
See application file for complete search history.

(56) References Cited

U.S. PATENT DOCUMENTS 7,524,067 B2 * 4/2009 Sato ................................ 353/42
7,686,454 B2 * 3/2010 Iketani et al. ................... 353/30

(Continued)

FOREIGN PATENT DOCUMENTS

JP    10-254614 A    9/1998
JP    2001-215610 A    8/2001

(Continued)

OTHER PUBLICATIONS

ISR for PCT/JP2010/058931 dated Aug. 17, 2010.

*Primary Examiner* — Tony Ko
*Assistant Examiner* — Jori S Reilly-Daikun
(74) *Attorney, Agent, or Firm* — Lowe Hauptman & Ham, LLP

(57) ABSTRACT

A mobile electronic device includes: a housing; an image projector provided on the housing for projecting a portion of an original image to a projection area; and a processing unit. The processing unit causes the image projector to change an image projected to the projection area from a first image corresponding to a first portion of the original image to a second image corresponding to a second portion of the original image according to change information for changing the image projected by the image projector.

19 Claims, 19 Drawing Sheets

(56) References Cited

U.S. PATENT DOCUMENTS

| | | | |
|---|---|---|---|
| 7,722,190 B2 * | 5/2010 | Weng et al. | 353/31 |
| 8,016,423 B2 * | 9/2011 | Makino | 353/30 |
| 8,351,983 B2 * | 1/2013 | Kim et al. | 455/556.1 |
| 8,366,279 B2 * | 2/2013 | Inoguchi et al. | 353/99 |
| 8,419,195 B2 * | 4/2013 | Nishigaki et al. | 353/99 |
| 8,506,090 B2 * | 8/2013 | Nicoli et al. | 353/69 |
| 2009/0096994 A1 * | 4/2009 | Smits | 353/30 |
| 2010/0141897 A1 * | 6/2010 | Kawano et al. | 353/34 |
| 2012/0086915 A1 * | 4/2012 | Rosen et al. | 353/30 |

FOREIGN PATENT DOCUMENTS

| | | |
|---|---|---|
| JP | 2002-261889 A | 9/2002 |
| JP | 2005338249 A | 12/2005 |
| JP | 2007-017177 A | 1/2007 |
| JP | 2007-096542 A | 4/2007 |

* cited by examiner

MOBILE ELECTRONIC DEVICE HAVING A PARTIAL IMAGE PROJECTOR

RELATED APPLICATIONS

The present application is national phase of PCT/JP2010/058931 filed May 26, 2010, and claims priority from Japanese Application Number 2009-128299 filed May 27, 2009.

TECHNICAL FIELD

The present invention relates to a mobile electronic device including an image projector for projecting an image to a screen or to a wall surface.

BACKGROUND ART

As a conventional device for projecting an image to a wall surface or a screen, a so-called projector is used. A mainstream of the projector is a so-called stationary type device which is supplied with electric power from a commercial power supply and is fixed to a predetermined location to use. The stationary type projector projects, in its fixed state, an image to a given portion of the wall surface or to the screen.

Recently, on the other hand, a mobile projector compact in size and easy to carry is proposed as the projector. For example, Patent Literature 1 describes a mobile terminal with a projector function that is provided with an upper cabinet, a lower cabinet, and a hinge portion for mutually pivotally connecting the upper cabinet and the lower cabinet, and is provided with a built-in projector that includes a lens and a light source.

CITATION LIST

Patent Literature

Patent Literature 1: Japanese Patent Application Laid-open No. 2007-96542

DISCLOSURE OF INVENTION

Problem to be Solved by the Invention

Incidentally, the projector built into the mobile electronic device has a small area for image projection, and thus, when a large image is projected, it becomes difficult to see its details. If an image is enlarged and a part of its original image is projected in order to solve this problem, then it may sometimes be required to project any other portion, of the original image, not currently projected. An object of the present invention is to improve, when a mobile electronic device with an image projector enlarges an image and projects a part of the image, the usability in a case of projecting any other portion of the image.

SUMMARY OF THE INVENTION

According to an aspect, a mobile electronic device includes: a housing; an image projector provided on the housing for projecting an image; and a processing unit for causing the image projector to project an image based on part of predetermined image information. The processing unit causes, when the image projector projects a first image based on first image information as the part of the predetermined image information, the image projector to project a second image based on second image information to a position at least part of which is different from a projection position of the first image, according to change information for changing the image projected by the image projector. The second image information is part of the predetermined image information, includes new information different from the first image information, and removes at least part of the first image information.

According to another aspect, the change information is information for a movement of the image projector.

According to another aspect, the mobile electronic device further includes a movement detector for detecting a movement distance and a movement direction of the image projector. The processing unit determines the second image information and a position where the second image is projected based on the movement distance and the movement direction of the image projector. The second image information includes information for an image, as the new information, located on the side of the movement direction when viewed from the first image in the predetermined image based on the predetermined image information. The position where the second image is projected is a position displaced on the side of the movement direction by a distance corresponding to the movement distance.

According to another aspect, the movement detector is an acceleration sensor.

According to another aspect, the processing unit causes the image projector to project an image based on the image information and a moving point movable with respect to the image based on the image information.

According to another aspect, the change information is information for a movement direction and a movement distance of the moving point. The processing unit determines the second image information and a position where the second image is projected based on the movement distance and the movement direction of the moving point. The second image information includes information for an image, as the new information, located on the side of the movement direction when viewed from the first image in the predetermined image based on the predetermined image information. The position where the second image is projected is a position displaced on the side of the movement direction by a distance corresponding to the movement distance.

According to another aspect, the processing unit provides controls so as to determine the second image information and the position where the second image is projected and to cause the image projector to project the second image information in synchronization with a timing at which the moving point moves.

According to another aspect, the processing unit provides controls so as to determine the second image information and the position where the second image is projected and to cause the image projector to perform projection at a timing at which the moving point has moved a predetermined distance.

According to another aspect, the housing is provided with an input unit that generates the change information. The input unit generates, as the change information, information for a movement direction and information for a movement distance of a predetermined projection area. The processing unit determines the second image information and the position where the second image is projected and causes the image projector to project the second image information, based on the generated movement distance and movement direction of the predetermined projection area.

According to another aspect, the mobile electronic device further includes a display unit for displaying an image. The processing unit causes the display unit to display the predetermined image based on the image information.

According to another aspect, the processing unit causes, when causing the image projector to project the first image or the second image, the display unit to display the predetermined image.

According to another aspect, the processing unit causes the image projector to project a moving point movable with respect to the image based on the image information and causes the display unit to display the moving point.

Effect of the Invention

When the mobile electronic device with the image projector enlarges an image and projects a part of the image, the present invention is capable of improving the usability in the case of projecting any other portion of the image.

DESCRIPTION OF EMBODIMENTS

Embodiments of the present invention will be explained in detail below with reference to the drawings. It should be noted that the present invention is not limited by the following explanation. In addition, the components in the explanation below include those which are easily thought of by persons skilled in the art, those substantially equivalents, and those in a scope of so-called equivalents. In the following, a mobile phone is used to explain as an example of the mobile electronic device, however, the mobile electronic device is not limited to the mobile phone, and may, therefore, be those such as PHS (Personal Handyphone System), PDA, a portable navigation device, a mobile personal computer, and a game machine.

First Embodiment

Figure 1:
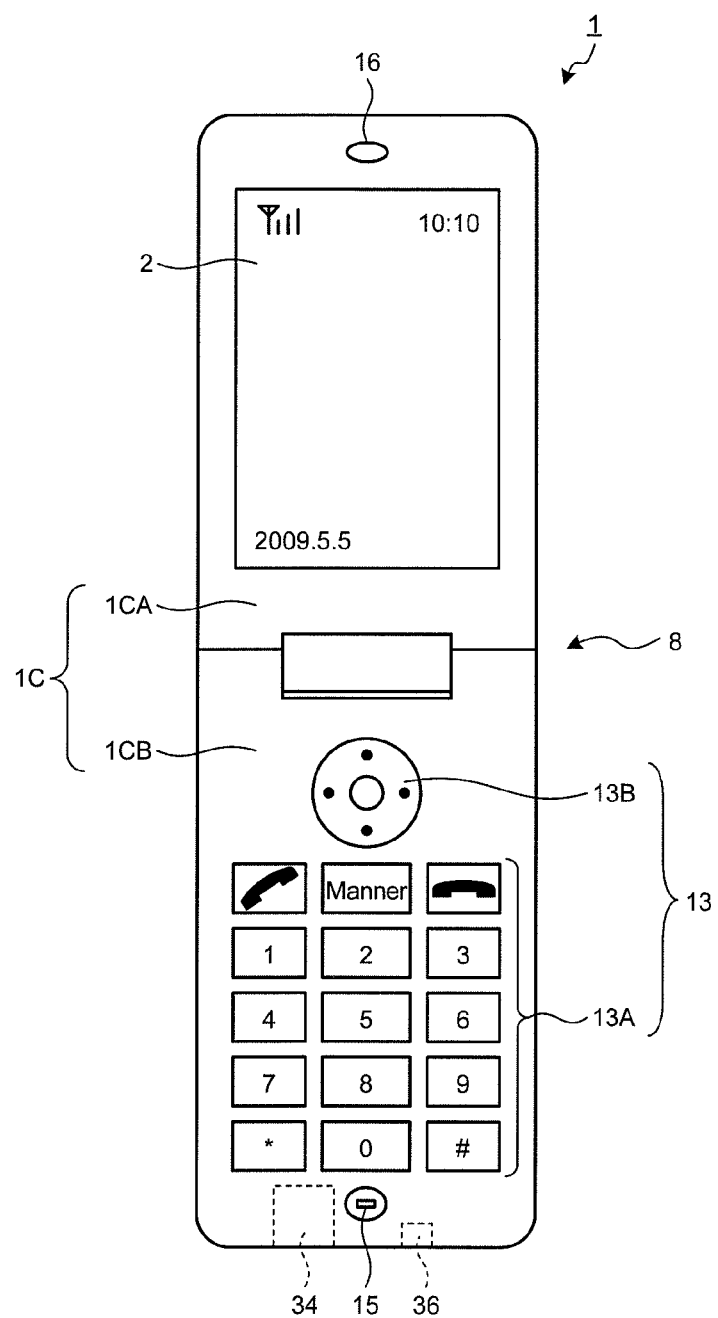
FIG. 1 is a diagram illustrating a schematic configuration of one embodiment of a mobile electronic device according to a first embodiment.
Figure 2:
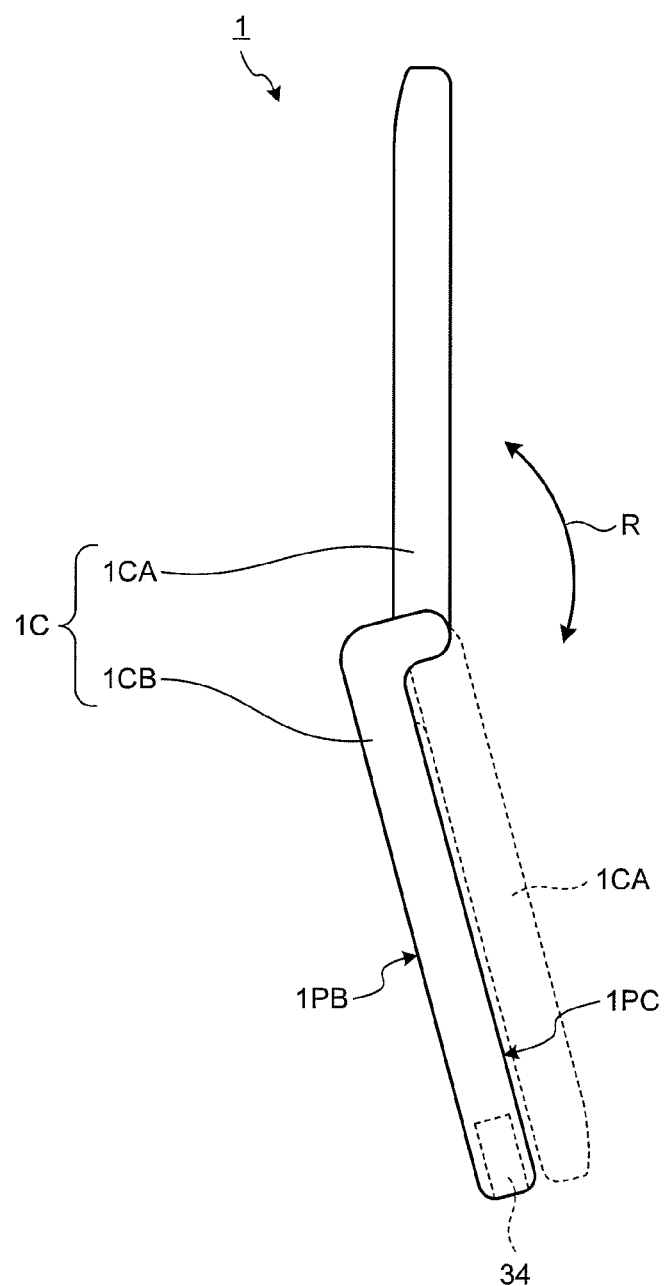
FIG. 2 is a diagram illustrating a schematic configuration of one embodiment of the mobile electronic device according to the first embodiment.

FIG. 1 and FIG. 2 are diagrams illustrating a schematic configuration of one embodiment of a mobile electronic device according to a first embodiment. A mobile electronic device 1 illustrated in FIG. 1 and FIG. 2 is a mobile phone that includes a wireless communication function, an output unit, a sound acquiring unit, and an imaging unit. The mobile electronic device 1 has a housing 1C formed with a plurality of housings. Specifically, the housing 1C is formed with a first housing 1CA and a second housing 1CB which are openable/closable. That is, the mobile electronic device 1 has a folding housing. The housing of the mobile electronic device 1 is not limited to this configuration. For example, the housing of the mobile electronic device 1 may be a sliding housing in which one housing and the other housing can mutually slide each other from a state where both the housings are overlapped, may be a rotating housing in which one of housings is made to rotate around an axis line along an overlapping direction, or may be a housing in which both housings are coupled to each other via a two-axis hinge.

The first housing 1CA and the second housing 1CB are coupled to each other by a hinge mechanism 8 being a coupling portion. By coupling the first housing 1CA and the second housing 1CB with the hinge mechanism 8, both the first housing 1CA and the second housing 1CB can pivot around the hinge mechanism 8 so as to pivot in a direction of mutually separating from each other and a direction of mutually approaching each other (directions indicated by arrow R in FIG. 2).

The first housing 1CA includes a display 2 illustrated in FIG. 1 as a display unit. The display 2 displays a standby image when the mobile electronic device 1 awaits reception, and displays a menu image used to assist the operations of the mobile electronic device 1. The first housing 1CA also includes a receiver 16 being an output unit that outputs speech during a telephone call using the mobile electronic device 1.

The second housing 1CB includes a plurality of operation keys 13A used to input a telephone number of the party on the other end of the phone and a text when mail is composed, and includes a direction and decision key 13B so as to easily perform selection and decision of a menu displayed on the display 2 and perform scrolling of a screen, or the like. The operation keys 13A and the direction and decision key 13B form an operating unit 13 of the mobile electronic device 1. Provided in the second housing 1CB is a microphone 15 being a sound acquiring unit that receives speech during a telephone call using the mobile electronic device 1. The operating unit 13 is provided on an operating surface 1PC of the second housing 1CB as illustrated in FIG. 2. The face opposite to the operating surface 1PC is a back face 1PB of the mobile electronic device 1.

An antenna is internally provided in the second housing 1CB. The antenna is a transmitting and receiving antenna used for wireless communication, and is used for transmission and reception of radio waves (electromagnetic waves) related to telephone call and electronic mail and so on between the mobile electronic device 1 and a base station. The second housing 1CB includes the microphone 15. The microphone 15 is located on the side of the operating surface 1PC of the mobile electronic device 1 as illustrated in FIG. 2.

Provided on the opposite side of the hinge mechanism 8 of the second housing 1CB are a projector 34 being an image projector and a distance sensor 36 being a distance measuring unit for measuring a distance from a light emitting portion (objective lens) of the projector 34 to an image projection target. This configuration enables the projector 34 to project an image to a projection target and enables the distance sensor 36 to measure a distance between the light emitting surface of the projector 34 and the projection target and to automatically focus the image projected by the projector 34. The light emitting portion of the projector 34 is exposed to the outside of the second housing 1CB.

Figure 3:
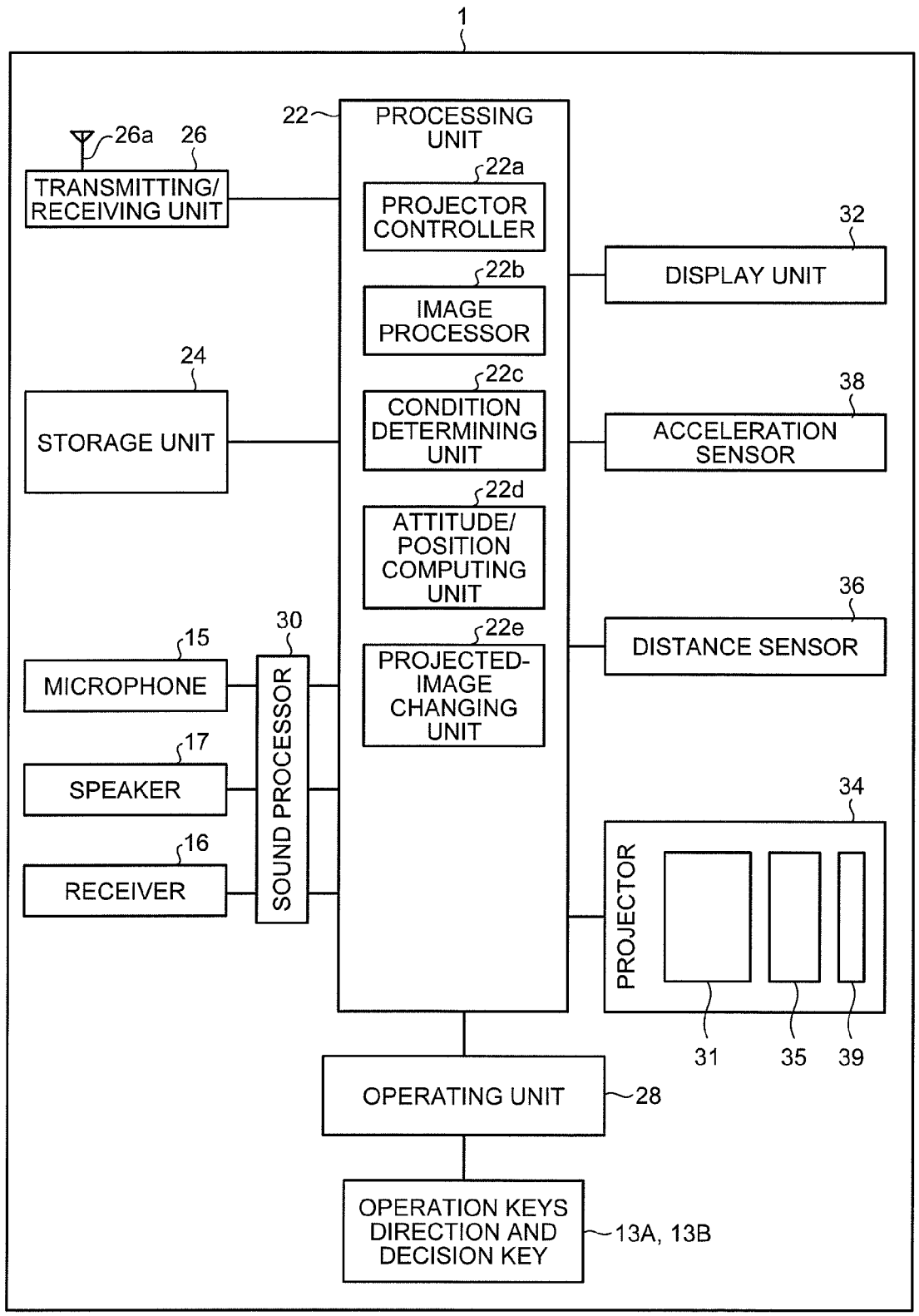
FIG. 3 is a block diagram illustrating a schematic configuration of functions of the mobile electronic device illustrated in FIG. 1 and FIG. 2.

FIG. 3 is a block diagram illustrating a schematic configuration of functions of the mobile electronic device illustrated in FIG. 1 and FIG. 2. As illustrated in FIG. 3, the mobile electronic device 1 includes a processing unit 22, a storage unit 24, a transmitting/receiving unit 26, the operating unit 13, a sound processor 30, a display unit 32, the projector 34, the distance sensor 36, and an acceleration sensor 38 being a movement detector. The processing unit 22 includes a function of integrally controlling an entire operation of the mobile electronic device 1. That is, the processing unit 22 controls the operations of the transmitting/receiving unit 26, the sound processor 30, and the display unit 32 and the like so that various processes of the mobile electronic device 1 are executed in an appropriate procedure according to an operation through the operating unit 13 and software stored in the storage unit 24 of the mobile electronic device 1.

The various processes of the mobile electronic device 1 are, for example, voice phone conversation over a line switching network, composition and transmission/reception of electronic mail, and browsing of Web (World Wide Web) sites on the Internet. The operations of the transmitting/receiving unit 26, the sound processor 30, and the display unit 32 and the like are, for example, signal transmission/reception by the transmitting/receiving unit 26, speech input/output by the sound processor 30, and image display by the display unit 32.

The processing unit 22 executes various processes for the mobile electronic device 1 based on programs (for example, operating system programs and application programs) stored in the storage unit 24. The processing unit 22 is, for example, MPU (Micro Processing Unit) and executes the various processes of the mobile electronic device 1 according to the procedure instructed by the software. For example, the processing unit 22 sequentially reads operation codes from the operating system programs and the application programs or the like stored in the storage unit 24 to perform the processes.

The processing unit 22 has a function of executing a plurality of application programs. The application programs executed by the processing unit 22 include a plurality of application programs such as an application program for controlling the drive of the projector 34 and the distance sensor 36, an application program for reading various image files (image information) from the storage unit 24 and decoding them, and an application program for causing the display unit 32 to display an image obtained by being decoded or for causing the projector 34 to projecting the image.

In the present embodiment, the processing unit 22 includes a projector controller 22a, an image processor 22b, a condition determining unit 22c, an attitude/position computing unit 22d, and a projected-image changing unit 22e. Hardware resources including the processing unit 22 and the storage unit 24 perform each task allocated by the processing unit 22, and thus functions respectively provided in the projector controller 22a, the image processor 22b, the condition determining unit 22c, the attitude/position computing unit 22d, and the projected-image changing unit 22e are implemented. The task mentioned here represents a unit of processing in which some processes cannot be simultaneously executed, of all processes performed by the application software or of processes performed by the same application software.

The storage unit 24 stores therein software and data used for processes executed by the processing unit 22. The storage unit 24 also stores therein a task activating an application program that controls the drive of the projector 34 and the distance sensor 36, and a task activating an image processing program. The storage unit 24 stores therein, in addition to the tasks, for example, sound data downloaded through communications or the like, software used by the processing unit 22 to provide control for the storage unit 24, an address book in which telephone numbers of the other parties on the phone and mail addresses and the like are written for management, a sound file such as a dial tone and a ring tone, and temporary data used in the processing process of the software.

The computer program and the temporary data used in the processing process of the software are temporarily stored in a work area of the storage unit 24 allocated to the storage unit 24 by the processing unit 22. The storage unit 24 includes, for example, nonvolatile storage devices (nonvolatile semiconductor memory such as ROM: Read Only Memory, a hard disk drive, and so on) and a readable/writable storage device (e.g., SRAM: Static Random Access Memory, and DRAM: Dynamic Random Access Memory).

The transmitting/receiving unit 26 includes an antenna 26a. The transmitting/receiving unit 26 establishes a wireless signal path using CDMA (Code Division Multiple Access) system or so with a base station via a channel allocated by the base station, and performs telephone communication and information communication with the base station. The operating unit 13 includes the operation keys 13A allocated with, for example, a power key, a talk key, numeric keys, character keys, direction keys, a decision key, a send key, and various functions; and the direction and decision key 13B. When any of the keys receives an input through a user operation, the key generates a signal corresponding to the content of the user operation. The generated signal is input to the processing unit 22 as an instruction of the user.

The sound processor 30 processes a sound signal input to the microphone 15 and a sound signal output from the receiver 16 and a speaker 17. That is, the sound processor 30 amplifies the sound input through the microphone 15, converts the sound to digital sound data by subjecting the sound to AD conversion (analog-to-digital conversion) and signal processing such as encoding, and outputs the converted sound data to the processing unit 22. The sound processor 30 converts the sound signal to an analog sound signal by subjecting the sound data sent from the processing unit 22 to processes such as decoding, DA conversion (digital-to-analog conversion), and amplification, and then outputs the converted sound signal to the receiver 16 and the speaker 17. The speaker 17 is disposed in the housing 1C of the mobile electronic device 1, and outputs a ring tone, a send tone of mail, or the like.

The display unit 32 includes the display 2. The display unit 32 displays a video according to video data and an image according to image data supplied from the processing unit 22 on a display panel. The display 2 is a display panel including, for example, LCD (Liquid Crystal Monitor) or an organic EL (Organic Electro-Luminescence) panel. The display unit 32 may include a sub-display in addition to the display 2.

The projector 34 includes a light source and an optical system for switching whether light emitted from the light source is to be projected based on the image data. In the present embodiment, the projector 34 includes a visible-light irradiation device (visible-light irradiating unit) 31 being the light source, a drawing device 35 being the optical system, and a focus adjustment device 39. The visible-light irradiation device 31 irradiates visible laser light. The light in a visible light region is a light whose short wavelength side is from 360 nm to 400 nm or more, and whose long wavelength side is from 760 nm to 830 nm or less. In the embodiment, the visible-light irradiation device 31 irradiates lights in three colors of R (Red), G (Green), and B (Blue).

The drawing device 35 synthesizes the lights in three colors irradiated from the visible-light irradiation device 31, and irradiates the image projection target with the synthesized lights. The drawing device 35 includes a switching element for switching whether the light emitted from the light source is caused to pass therethrough, and a mirror for causing the light having passed through the switching element to perform raster scan. The drawing device 35 changes an angle of the laser light emitted from the visible-light irradiation device 31 by the mirror and scans the laser light on the image projection target, to thereby project the image to the image projection target.

The mirror is, for example, an MEMS (Micro Electro Mechanical System) mirror. The MEMS mirror uses a piezoelectric element to drive the mirror, scans the visible light irradiated from the visible-light irradiation device 31, and generates a visible image or an invisible image. In this case, the mirror changes an angle of the light irradiated from the light source and scans the light irradiated from the light source over the whole surface of the image projection target, so that the visible image or the invisible image is projected to the image projection target. As explained above, the projector 34 is a scan type projector. The projector 34 is not limited to the projector that uses the laser as a light source. For example, the projector 34 may be a projector that uses a halogen light, an LED light source, or a LD light source as a light source, and includes an LCD (Liquid Crystal Monitor) or a DMD (Digital Micro-mirror Device) provided in the optical system.

For example, as is the case where the projector 34 is provided with an LCD optical system, if a focal length needs to be adjusted upon image projection, the projector 34 may be provided with the focus adjustment device 39. The focus adjustment device 39 includes a function (focus adjustment function) of forming a visible image projected from the drawing device 35 on the image projection target according to an instruction from the projector controller 22a. The focus adjustment device 39 is provided with, for example, a focus adjustment mechanism including a movable lens and so on, and moves the lens to implement the focus adjustment function. Alternatively, the focus adjustment device 39 may implement the focus adjustment function in such a manner that the image processor 22b subjects image data projected by the projector 34 to predetermined image processing. Furthermore, the focus adjustment device 39 may implement the focus adjustment function through a focus adjustment function and an image processing. The distance sensor 36 measures a distance between the light emitting portion of the projector 34 and the image projection target. Instead of the distance sensor 36, the function, in the focus adjustment device 39, of adjusting a focus of the image projected from the projector 34 may be used to measure a distance between the light emitting portion of the projector 34 and the image projection target.

Figure 4:
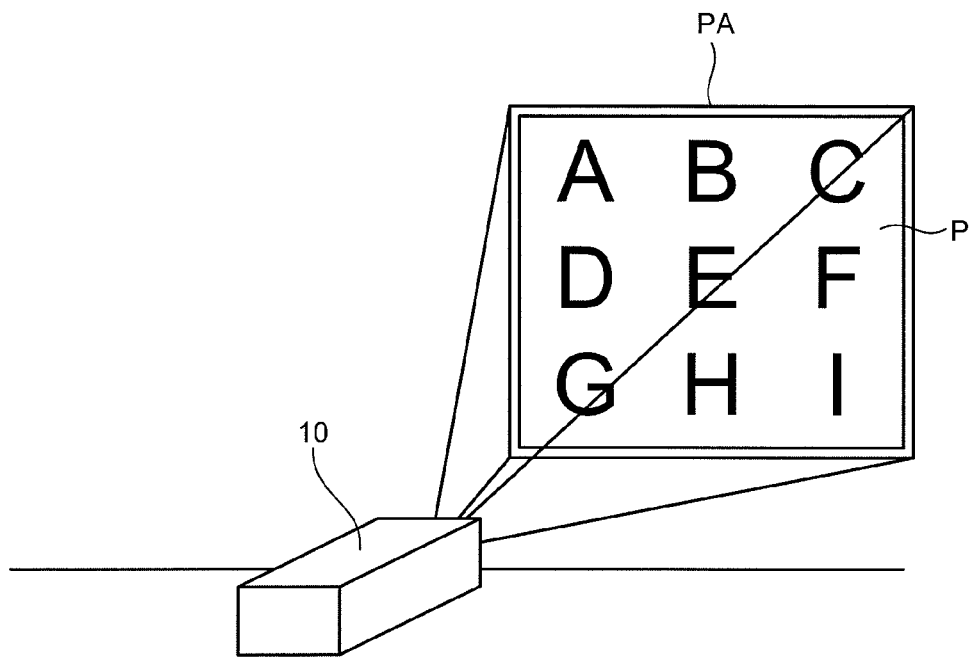
FIG. 4 is an explanatory diagram illustrating a state in which an image is drawn by a projector of the mobile electronic device illustrated in FIG. 1.

FIG. 4 is an explanatory diagram illustrating a state in which an image is drawn by the projector of the mobile electronic device illustrated in FIG. 1. As explained above, the projector 34 is the image projector that projects an image, and an image projection plane is exposed to the outside of the housing of the mobile electronic device 1. The mobile electronic device 1 projects an image from the projector 34 and thereby enables to project an image P to a predetermined area (projection area) PA, as illustrated in FIG. 4, of the image projection target (e.g., a wall surface and a screen) at a location facing the image projection plane of the projector 34. The projector 34 is controlled by the processing unit 22 for its operation, and projects any of various images such as a moving image or a presentation material sent from the processing unit 22, to display the image in a projection area PA.

Figure 5:
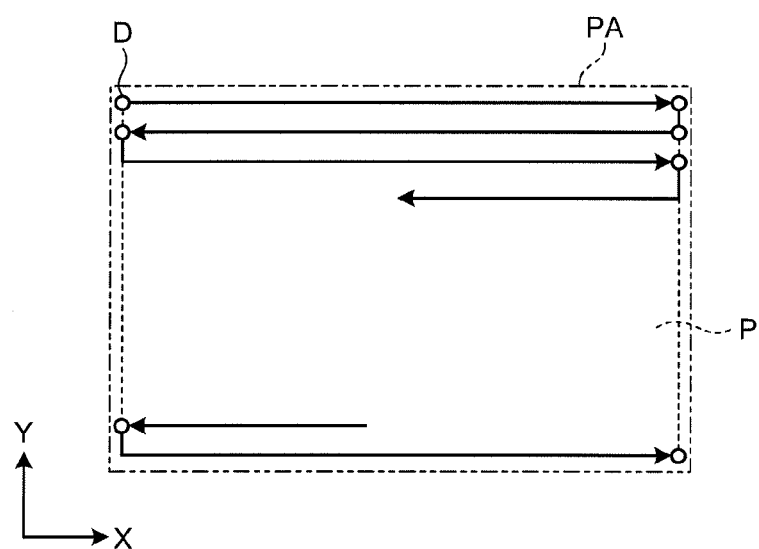
FIG. 5 is a schematic diagram illustrating a drawing method in a scanning type projector.

FIG. 5 is a schematic diagram illustrating a drawing method in a scanning type projector. The drawing device 35 illustrated in FIG. 3 scans a spot (light spot) D of the laser light irradiated from the visible-light irradiation device 31 of the projector 34 along the X direction and the Y direction, so that the image P is drawn within the projection area PA of the projector 34. At this time, the light spot D is scanned by reciprocating along the X direction, and is scanned in one direction with respect to the Y direction. When the projector 34 draws an image and if the image P is a rectangle, scanning of the light spot D is started from one of corners, to scan the light spot D over the whole area of the image P along the X direction and the Y direction. With this operation, one drawing is finished, and one image P is drawn.

The projector 34 built into the mobile electronic device 1 may be compact in size to project an image to a large area. In this case, an image with a large number of pixels has to be reduced in order to project its whole area to an image projection target. When such a material contains small characters and graphic, it is assumed that the content of the image is hard to be read in its reduced state. In this case, a part of the image (original image) with a large number of pixels is enlarged to be projected by the projector 34, however, the whole of the original image cannot be projected. In the present embodiment, by moving the mobile electronic device 1, a part of the original image different from the portion currently projected by the projector 34 can be projected. This function enables the image to be changed by an operation matching a person's feelings.

Figure 6:
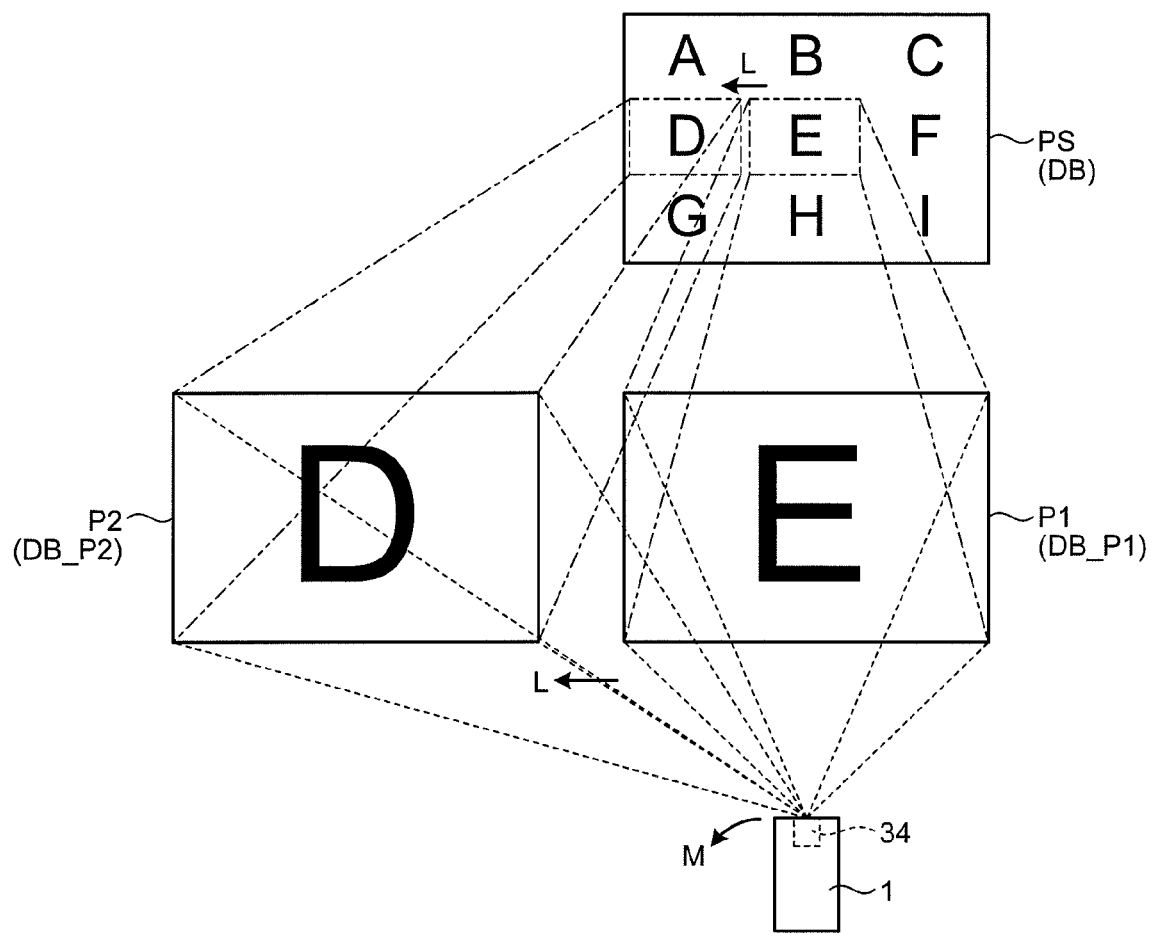
FIG. 6 is a schematic diagram illustrating how the projector is projecting the image to an image projection target.
Figure 7A:
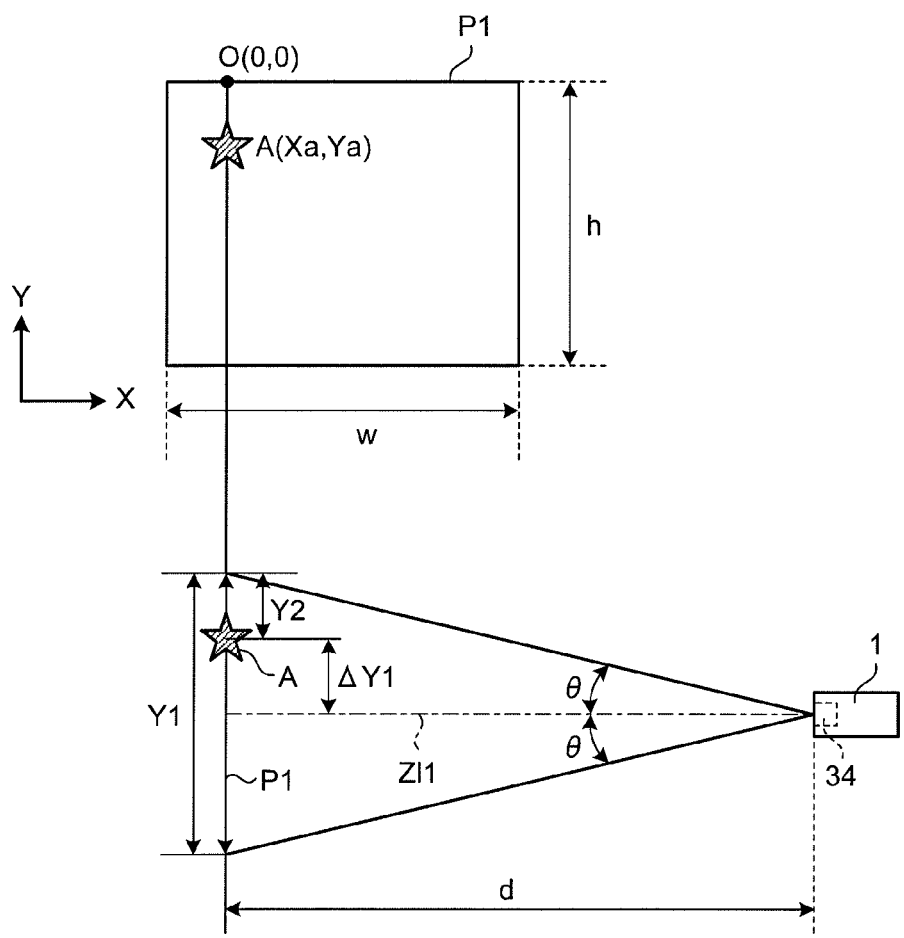
FIG. 7A is a diagram for explaining a method of changing an image projected by the projector provided in the mobile electronic device.
Figure 7B:
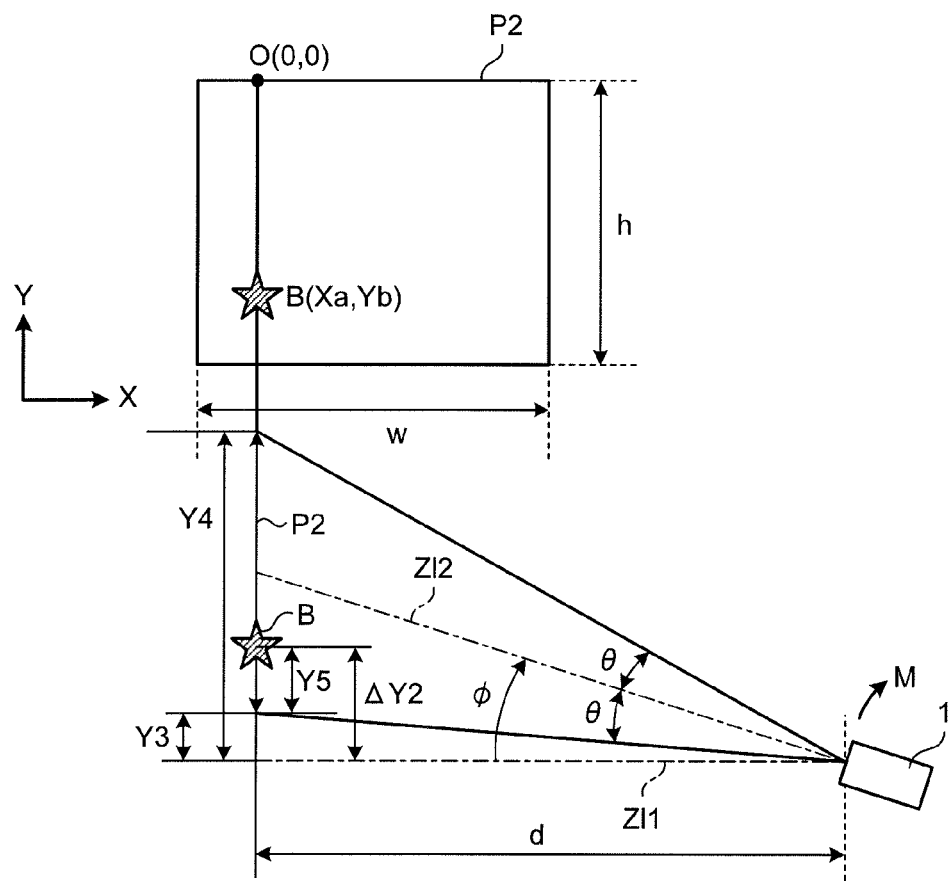
FIG. 7B is a diagram for explaining a method of changing an image projected by the projector provided in the mobile electronic device.

FIG. 6 is a schematic diagram illustrating how the projector is projecting the image to the image projection target. FIG. 7A and FIG. 7B are diagrams for explaining a method of changing an image projected by the projector provided in the mobile electronic device. In the present embodiment, the mobile electronic device 1 with the built-in projector 34 is moved to move the projection area of the projector 34 in synchronization with the movement, so that the image projected into the projection area is changed. That is, the part of the original image currently projected by the projector 34 is changed to another portion of the original image based on the movement of the projector 34. This function is suitable for use in a case where an image size of the original image is larger than an image size that can be projected by the projector 34.

The image projected by the projector 34 of the mobile electronic device 1 illustrated in FIG. 6 is an original image PS. The original image PS is generated from image information DB. The image information DB is information being the basis for an image to be projected by the projector 34, and the image processor 22b of the processing unit 22 illustrated in FIG. 3 generates an image to be projected by the projector 34 from the image information DB. The image information DB is, for example, a data file of an image described in a predetermined format. At this time, the processing unit 22 may display a predetermined image based on the image information DB on the display 2.

P1 and P2 in FIG. 6 are images (enlarged images) which are enlarged parts of the original image PS and are projected by the projector 34. An enlarged image P1 is an image obtained by enlarging a portion of "E" in the original image PS, and an enlarged image P2 is an image obtained by enlarging a portion of "D" in the original image PS. The enlarged images P1 and P2 are generated from pieces of image information DB_P1 and DB_P2, respectively. The image information DB_P1 and DB_P2 are parts of the image information DB for the original image PS. The image processor 22b of the processing unit 22 causes the projector 34 to project the original image PS and the enlarged images P1 and P2 based on the image information DB, DB_P1, and DB_P2, or the like, respectively. That is, the processing unit 22 causes the projector 34 to project an image (first image) based on at least part of the information (first image information) included in the image information (predetermined image information) DB.

When the mobile electronic device 1 is moved (rotated) in a direction of arrow M centered on the current position of the mobile electronic device 1 while the projector 34 is projecting the enlarged image P1, the projection area of the projector 34 moves in a direction indicated by arrow L in FIG. 6. The image projected by the projector 34 is changed from the enlarged image P1 (portion of "E" in the original image PS) to the enlarged image P2 (portion of "D" in the original image PS). The projection area of the projector 34 moves from the position where the enlarged image P1 is currently projected toward a direction (direction indicated by arrow L) in which the projection area of the projector 34 moves in response to the movement of the projector 34. Regarding the original image PS, in response to the movement of the projector 34, the portion projected by the projector 34 moves from the portion of "E" to the portion of "D".

As explained above, in the present embodiment, when the mobile electronic device 1 is moved to cause the projector 34 built into the mobile electronic device 1 to move, the image projected by the projector 34 is changed from the enlarged image P1 to the enlarged image P2 in synchronization with the movement of the mobile electronic device 1. At this time, a position where an enlarged image P1 is projected and a position where an enlarged image P2 is projected are different from each other at least partially. In the present embodiment, "a position where an enlarged image P1 is projected and a position where an enlarged image P2 is projected are different from each other" indicates that perfect matching between the position where the enlarged image P1 is projected and the position where the enlarged image P2 is projected is eliminated, but that partial matching between the enlarged image P1 and the enlarged image P2 is included. That is, the enlarged image P2 is projected to a position at least part of which is different from the position where the enlarged image P1 is projected.

In this example, the enlarged image P2 is a second image, and the image information DB_P2 is second image information. The enlarged image P2 being the second image is projected to a position at least part of which is different from the projected position of the enlarged image P1 being the first image. The second image information is part of predetermined image information (image information DB), includes new information different from the first image information, and eliminates at least part of the image information DB_P1 being the first image information. The second image information includes information, as the new information, for an image located on the side of the movement direction of the image projector when viewed from the first image in the predetermined image based on the predetermined image information. When the first image or the second image is projected, the processing unit 22 may display the predetermined image based on the image information DB on the display 2.

By doing in such a manner, when changing an image, the user only needs to move the mobile electronic device 1 toward an area assumed that there is an image desired to be changed, and thus, the image projected by the projector 34 of the mobile electronic device 1 can be changed through a simple operation. At the same time, the image projected by the projector 34 can be changed through an operation matching a person's feelings.

In order to change the image projected by the projector 34 in synchronization with the movement of the projector 34 built into the mobile electronic device 1, it is necessary, when the projection area is moved with respect to the image projection target, to previously check in which direction and how far the projection area of the image projected by the projector 34 moves. First, as illustrated in FIG. 7A, a distance between the light emitting portion of the projector 34 and the image projection target is set as d in a state where the projector 34 and the image projection target face each other. The state where the projector 34 and the image projection target face each other is a state where a direction orthogonal to the image projection plane of the image projection target and an optical axis of the projector 34 (an emission direction of the light at the center of the light emitting portion) become parallel to each other. The distance d is obtained by the attitude/position computing unit 22d of the processing unit 22 illustrated in FIG. 3 using the distance sensor 36 built into the mobile electronic device 1. If the focal length of the projector 34 is previously set, d may be set as a given value (e.g., focal length).

The state where the projector 34 and the image projection target face each other may be previously stored in the storage unit 24 as an initial position, and thus a distance and a direction of moving the projection area of the projector 34 are determined based on the initial position. The initial position may be reset as required according to the movement of the projector 34 (mobile electronic device 1).

Next, as illustrated in FIG. 7B, a case, in which the mobile electronic device 1 is rotated in the direction of arrow M at that position and the projector 34 is inclined from the state where the projector 34 and the image projection target face each other, is assumed. In this case, the projector 34 moves at almost the same position, the optical axis of the projector 34 is changed from Z11 to Z12, and an angle (projector inclined angle) formed by the optical axis Z11 and the optical axis Z12 becomes $\phi$. In this state, a spot A (Xa, Ya) on the image P1 projected to the image projection target does not move on the projection plane of the image projection target. However, the spot A moves to a spot B (Xb, Yb) between the image P1 and the image P2 actually projected by the projector 34. At this time, a movement distance Ldot per pixel on the image projection plane of the image projection target is represented by Equation (1):

$$L\text{dot}=Yb-Ya. \tag{1}$$

The position of the spot A and the position of spot B do not change on the projection plane of the image projection target before and after the projector 34 is inclined, and thus Equation (2) holds:

$$\Delta Y1 = \Delta Y2 \tag{2}$$

where $\Delta Y1 = Y1/2 - Y2$, $\Delta Y2 = Y3 + Y5$, $Y1/2 = h/2 = d \times \tan\theta$, $Y2 = Ya/(h/2) \times d \times \tan\theta = 2 \times Ya \times d \times \tan\theta/h$, $Y3 = d \times \tan(\phi - \theta)$, and $Y5 = \{d \times \tan(\phi+\theta) - d \times \tan(\phi-\theta)\} \times (h-Yb)/h$.

Therefore, Equation (2) can be expressed like Equation (3):

$$d \times \tan\theta - 2 \times Ya \times d \times \tan\theta/h = d \times \tan(\phi-\theta) + \{d \times \tan(\phi+\theta) - d \times \tan(\phi-\theta)\} \times (h-Yb)/h. \tag{3}$$

Because $h=2 \times d \times \tan\theta$ in the image P1 and $h=Y4-Y3=d\times\tan(\phi+\theta)-d\times\tan(\phi-\theta)$ in the image P2, Equation (3) is rewritten to Equation (3)':

$$d \times \tan\theta - Ya = d \times \tan(\phi-\theta) + \{d \times \tan(\phi+\theta) - d \times \tan(\phi-\theta)\} \times \{1 - Yb/(d \times \tan(\phi+\theta) - d \times \tan(\phi-\theta))\}. \tag{3'}$$

Because $2 \times \theta$ is a projection angle of the projector 34, the size of $\theta$ is one-half of the projection angle of the projector 34. Sign h is a dimension in the Y direction (direction parallel to the vertical direction in the examples illustrated in FIG. 7A and FIG. 7B) of the images P1 and P2 projected by the projector 34. Sign w illustrated in FIG. 7A and FIG. 7B is a dimension in the X direction (direction orthogonal to the Y direction illustrated in FIG. 7A and FIG. 7B) of the images P1 and P2 projected by the projector 34.

The projection angle $2 \times \theta$ of the projector 34 is known from the specification of the projector 34. Because Ya is a Y coordinate at an arbitrary point on the image P1 projected by the projector 34, it can be determined based on the image information of the image P1. A projector inclined angle $\phi$ is calculated by the attitude/position computing unit 22d based on the value of acceleration (acceleration of the mobile electronic device 1) of the projector 34 detected by the acceleration sensor 38 illustrated in FIG. 3. A movement direction of the image projected to the image projection target is also calculated by the attitude/position computing unit 22d based on the information for the acceleration of the projector 34 detected by the acceleration sensor 38 illustrated in FIG. 3. In the present embodiment, the acceleration sensor 38 is a tri-axial acceleration sensor. As explained above, the acceleration sensor 38 detects a movement distance and a movement direction.

The attitude/position computing unit 22d solves Equation (3)' for Yb, gives the obtained Yb to Equation (1), and gives $\theta$, Ya, $\phi$, and d to an equation obtained by solving Equation (1) for Ya, so that a movement distance Ldot per pixel on the projection plane of the image projection target can be determined. The movement distance Ldot is determined by the attitude/position computing unit 22d.

The attitude/position computing unit 22d performs the calculation for all the pixels forming the image P1, so that each of movement distances of all the pixels (movement distance per pixel on the projection plane of the image projection target) that form the image P1 when the projector 34 is inclined at an angle $\phi$ can be determined. Moving a predetermined pixel by Ldot over the image projection plane of the image projection target causes a corresponding pixel in the image information to move by Ldot.

A case where the user of the mobile electronic device 1 moves the mobile electronic device 1 while holding the mobile electronic device 1 by hand is divided roughly into a case where the mobile electronic device 1 is moved by the motion of user's wrist and a case where the mobile electronic device 1 is moved by the motion of user's forearm. In the former case, the mobile electronic device 1 moves almost at the same position, and thus the projector 34 also moves almost at the same position. In this case, the movement distance Ldot per pixel on the projection plane of the image projection target can be determined using the above explained method. In the latter case, on the other hand, the mobile electronic device 1 moves from the previous location by the motion of the arm, and so it is necessary to allow for the movement (movement distance and movement direction).

Figure 8:
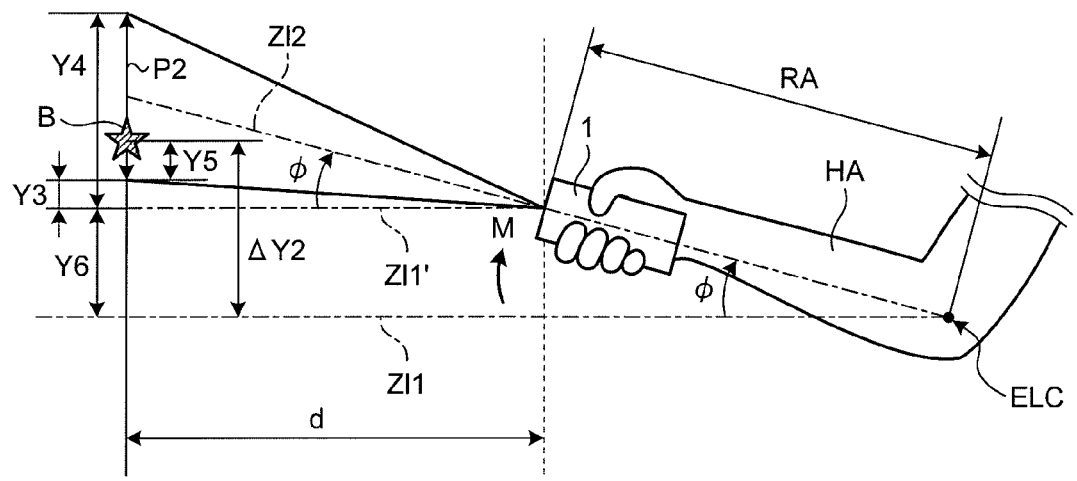
FIG. 8 is a diagram for explaining a method of changing an image to be projected regarding a mobile electronic device held by hand.

FIG. 8 is a diagram for explaining a method of changing an image to be projected regarding a mobile electronic device held by hand. When the mobile electronic device 1 is moved by the motion of a forearm HA, as illustrated in FIG. 8, the forearm HA pivots around a pivotal center ELC (portion of elbow joint). In this case, a distance between the pivotal center ELC and the light emitting portion of the projector 34 of the mobile electronic device 1 held by hand is set as RA. A case, in which the projector 34 held by hand is pivoted in a direction of arrow M in FIG. 8 around the pivotal center ELC, the projector 34 is inclined from a state where the projector 34 and the image projection target face each other, the optical axis of the projector 34 is thereby changed from Z11 to Z12, and a projector inclined angle (angle formed by an axis Z11' parallel to the optical axis Z11 and the optical axis Z12) becomes $\phi$, is assumed. In this case, $\Delta Y2$ is determined by Equation (4):

$$\Delta Y2 = Y6 + Y3 + Y5 \tag{4}$$

where Y6 is $RA \times \sin\phi$. Therefore, Equation (3)' becomes like Equation (5):

$$d \times \tan\theta - Ya = RA \times \sin\phi + d \times \tan(\phi-\theta) + \{d \times \tan(\phi+\theta) - d \times \tan(\phi-\theta)\} \times \{1 - Yb/(d \times \tan(\phi+\theta) - d \times \tan(\phi-\theta))\}. \tag{5}$$

The attitude/position computing unit 22d solves Equation (5) for Yb, gives the obtained Yb to Equation (1), and gives θ, Ya, φ, and d to an equation obtained by solving Equation (1) for Ya, so that a movement distance Ldot per pixel on the projection plane of the image projection target can be determined when the mobile electronic device 1 is moved by the motion of the forearm HA.

Figure 9:
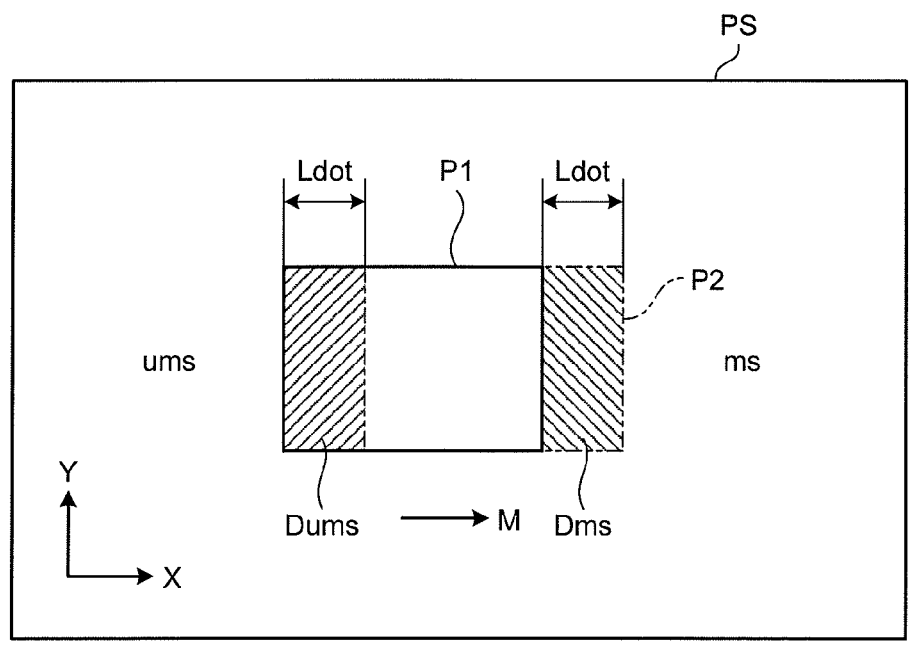
FIG. 9 is a diagram illustrating a state of changing an image to be projected in synchronization with a movement of the projector built into the mobile electronic device.

FIG. 9 is a diagram illustrating a state of changing an image to be projected in synchronization with a movement of the projector built into the mobile electronic device. When the movement distance Ldot per pixel on the image projection plane of the image projection target is determined using the method, the projected-image changing unit 22e of the processing unit 22 in FIG. 3 moves the projection area of the projector 34 by the movement distance Ldot toward the movement direction determined based on the movement of the projector 34. With this process, the projection area of the projector 34 moves from the position of the currently projected image P1 (see FIG. 7A) to the position of the image P2 (see FIG. 7B). In this case, the movement direction (direction of arrow M in FIG. 9) of the projection area of the projector 34 is determined from a value detected by the acceleration sensor 38 as explained above.

The projected-image changing unit 22e causes the projector 34 to project information (information for a portion indicated by Dms) on ms side of the movement direction when viewed from the original information for the currently projected image P1, of the image information for the original image PS, by a portion corresponding to the movement distance Ldot. The projected-image changing unit 22e controls the projector 34 so as not to project original information (information for a portion indicated by Dums) for the portion projected on ums side of the opposite direction to the movement direction ms, of the currently projected image P1, by the portion corresponding to the movement distance Ldot.

Through the process, the projection area PA of the projector 34 moves from the position of the image P1 indicated by the solid line to the position of the image P2 indicated by the two-dot chain line in synchronization with the movement of the projector 34. The processing unit 22 causes the projector 34 to project the image P2, to a position different from the image P1, based on information that includes information different from the original information for the currently projected image P1 and eliminates at least part of the original information for the currently projected image P1, of the image information for the original image PS.

In the present embodiment, by moving the mobile electronic device 1 when the image is projected by the projector 34 through the process, the image for a different portion of the original image PS is projected in synchronization with the movement, so that the image can be changed by an operation matching the person's feelings. As a result, when the image is enlarged and a part of the image is projected, the usability in the case of projecting any other portion of the image can be improved.

Figure 10:
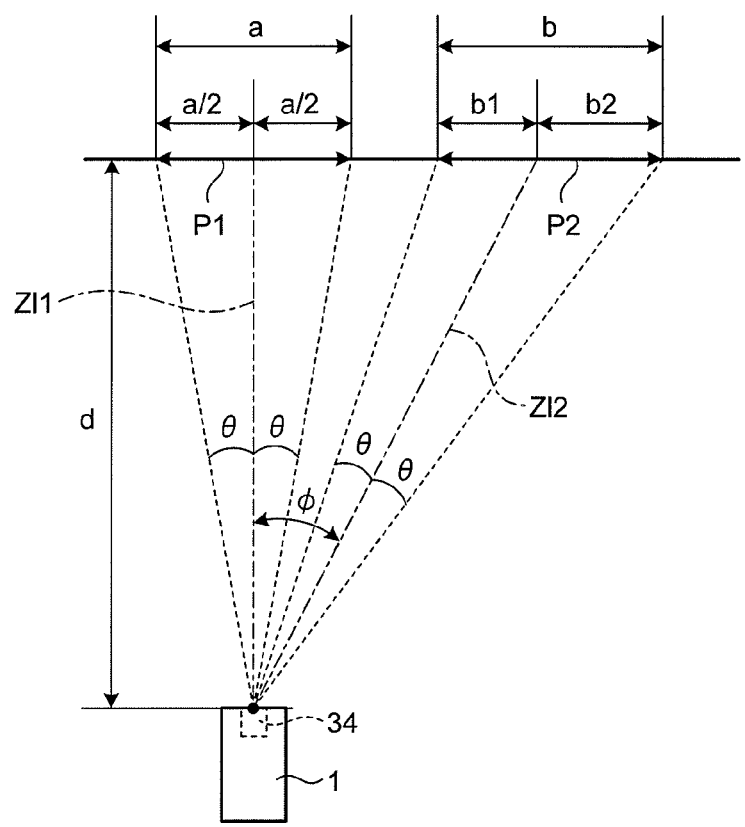
FIG. 10 is a diagram for explaining correction when an image to be projected is changed.

FIG. 10 is a diagram for explaining correction when an image to be projected is changed. When the projector 34 faces the image projection plane of the image projection target, the image P1 projected to the image projection target has a length of a/2 each in both areas with respect to the optical axis Z11 of the projector 34. On the other hand, when the projector 34 is inclined with respect to the image projection plane of the image projection target, the image P2 projected to the image projection target has lengths of b1 and b2 (b=b1+b2) in both areas with respect to the optical axis Z12 of the projector 34. Here, b1 is expressed by Equation (6) and b2 is expressed by Equation (7), where φ is a projector inclined angle which is an angle formed by the optical axis Z12 and the image projection plane of the image projection target:

$$b1 = d \times (\tan(\phi+\theta) - \tan\phi), \quad (6)$$

$$b2 = d \times (\tan\phi - \tan(\phi-\theta)). \quad (7)$$

If the number of pixels arranged in b1 is the same as the number of pixels arranged in b2, the image P2 may sometimes be seen distorted. Therefore, when the angle formed by the optical axis of the projector 34 and the image projection plane of the image projection target becomes any value other than 90 degrees as a result of moving the projector 34, it is preferable to adjust a distance between pixels, that is, pixel pitches in both areas of the image P2 centered on the optical axis Z12 so as to eliminate distortion in the image P2. For example, pixel pitches are made equal to each other in the both areas of the image P2 centered on the optical axis Z12. This enables the distortion of the image P2 after the movement to be prevented even if the movement of the mobile electronic device 1 causes the optical axis of the projector 34 to be inclined with respect to the image projection plane of the image projection target. Next, a control procedure of changing an image projected by the projector 34 by moving the mobile electronic device 1 according to the present embodiment will be briefly explained below.

Figure 11:
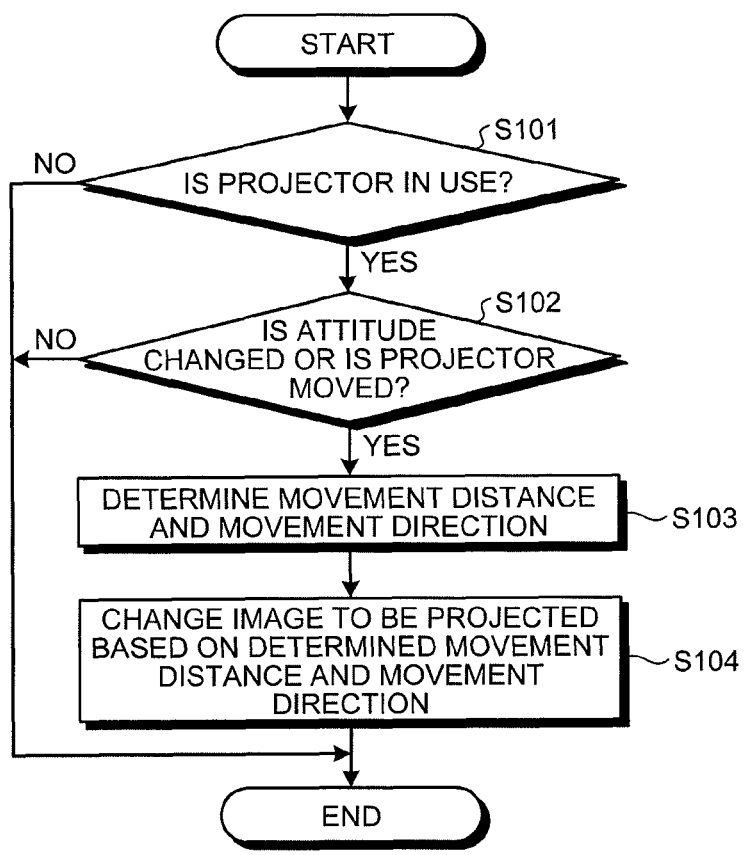
FIG. 11 is a flowchart illustrating a procedure for projecting a portion of an original image different from a potion thereof currently projected.

FIG. 11 is a flowchart illustrating a procedure for projecting a portion of an original image different from a potion thereof currently projected. At Step S101, the condition determining unit 22c of the processing unit 22 illustrated in FIG. 3 determines whether the projector 34 built into the mobile electronic device 1 is in use. If it is determined as No at Step S101, that is, when the condition determining unit 22c determines that the projector 34 is not in use, the present control is ended. If it is determined as Yes at Step S101, then the process proceeds to Step S102.

At Step S102, the condition determining unit 22c of the processing unit 22 illustrated in FIG. 3 determines whether the projector 34 in the mobile electronic device 1 moves, that is, whether the attitude of the projector 34 (mobile electronic device 1) is changed or the projector 34 is moved. In the present embodiment, the movement of the projector 34 is used as information (change information) for changing the image projected by the projector, and therefore it is determined at Step S102 whether the projector 34 is moved. In the present embodiment, the change information is information for a movement of the image projector.

If it is determined as No at Step S102, the present control is ended. If it is determined as Yes at Step S102, then the process proceeds to Step S103. At Step S103, the attitude/position computing unit 22d of the processing unit 22 illustrated in FIG. 3 determines a movement amount (movement distance Ldot) and a movement direction of the projection area of the projector 34 at this time based on the movement of the projector 34 (mobile electronic device 1), more specifically, based on its movement distance and movement direction. This method is as explained above. Next, the process proceeds to Step S104, where the projected-image changing unit 22e of the processing unit 22 illustrated in FIG. 3 moves the projection area of the projector 34 based on the movement amount and the movement direction determined at Step S103, and causes the projector 34 to project an image, different from the image in the projection area before the movement, into a projection area after the movement.

Figure 12:
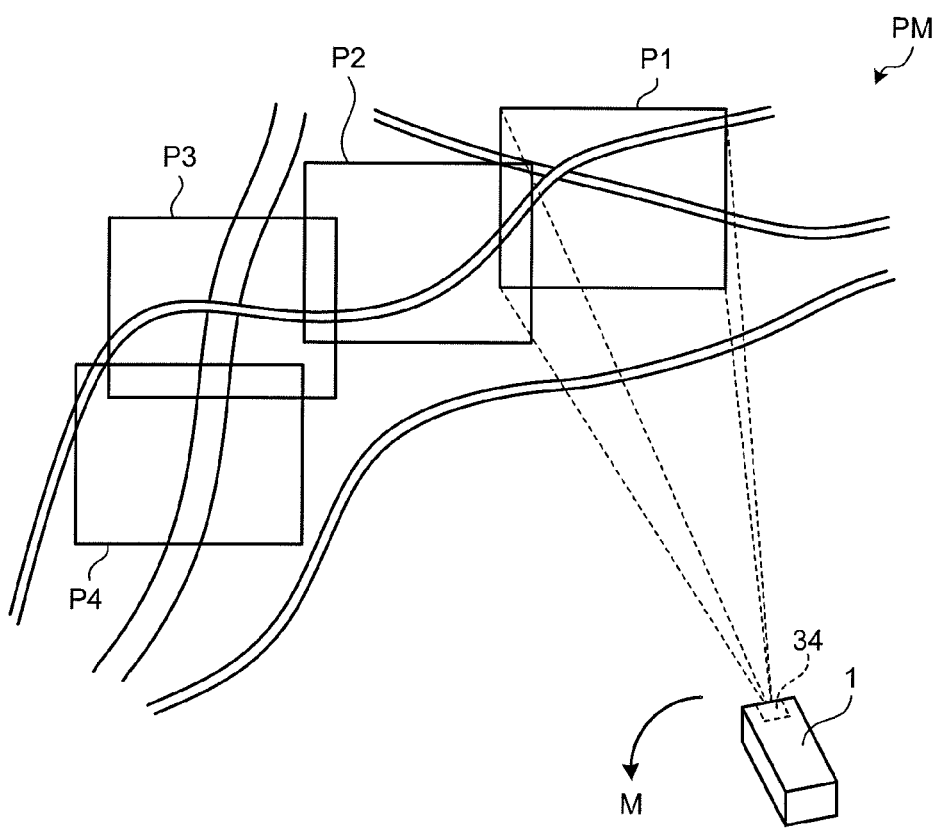
FIG. 12 is a diagram when an image projected by the projector built into the mobile electronic device is a map.

FIG. 12 to FIG. 15 are diagrams when an image projected by the projector built into the mobile electronic device is a map. In the present embodiment, the projector 34 provided in the mobile electronic device 1 illustrated in FIG. 1 and FIG. 3 can also project a map image PM as illustrated in FIG. 12. The map image PM is generated by the image processor 22b illustrated in FIG. 3 based on the image information used to generate this image.

When the projector 34 projects a map, it is also assumed that the content is hard to be read in its reduced state as explained above. Particularly, when a departure point and a destination of the movement is displayed on the map image PM and if a large map image PM is used, the entire map is displayed in the projection area, however, it is assumed that the content becomes hard to be read. Meanwhile, if the map image is enlarged for display, the entire map image PM does not fall within the projection area. Therefore, when the projector 34 also projects a map, a part of the map image (original image) to be projected by the projector 34 is enlarged and projected, and the image projected is changed in synchronization with the movement of the projector 34 (movement of the mobile electronic device 1).

For example, in the example of FIG. 12, the projector 34 built into the mobile electronic device 1 projects images P1, P2, P3, and P4 as images obtained by enlarging and projecting parts of the map image PM being the original image. In this case, when the mobile electronic device 1 is moved in the direction of arrow M in FIG. 12, the projector 34 also moves together with the device. The projected portion of the map image PM is changed to the images P2, P3, and P4 in synchronization with the movement of the projector 34 (movement of the mobile electronic device 1). With the processes for projection in the above manner, in the present embodiment, each part of the map image PM including many pieces of information is enlarged, so that the part can be displayed in an easy-to-see manner. In the present embodiment, by moving the mobile electronic device 1, a portion different from the currently projected portion of the map image PM can be projected by the projector 34 in a state as if the map image PM is fixed to the image projection target. As a result, when the part is enlarged for display, the image projection plane of a wall surface, a ceiling or the like as the image projection target and the position of the enlarged map image PM are uniquely determined, so that the portion of the map image PM desired to be displayed can be more easily changed with an operation matching a person's feelings than scrolling the screen.

Figure 13:
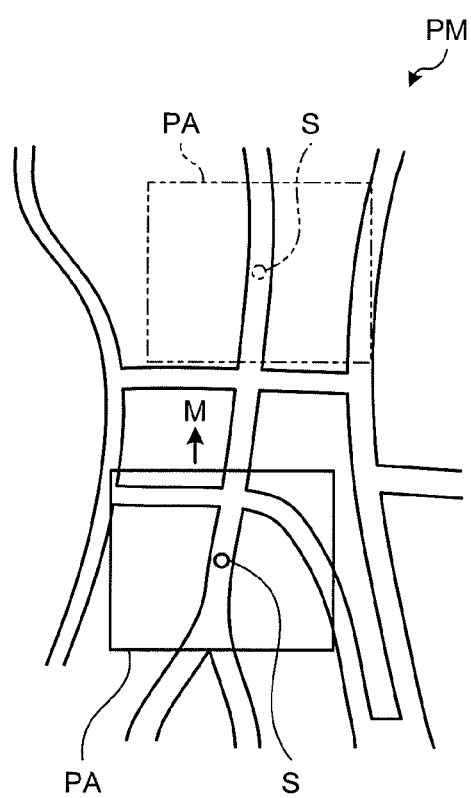
FIG. 13 is a diagram when an image projected by the projector built into the mobile electronic device is a map.

In the example illustrated in FIG. 13, a moving point S movable with respect to the map image PM is displayed together with the map image PM. The moving point S indicates a moving object moving over the map image PM. The projected-image changing unit 22e provided in the processing unit 22 of the mobile electronic device 1 illustrated in FIG. 3 can move the moving point S over the map image PM and execute simulation of a case, for example, where the moving object reaches the destination from the departure point. In this case, the image, of the map image PM, projected to the image projection target is changed according to the movement of the moving point S.

In this case, the information for the movement direction and the movement distance of the moving point S is used as the change information. That is, when the projected-image changing unit 22e moves the moving point S, the attitude/position computing unit 22d of the processing unit 22 acquires the movement amount and the movement direction of the moving point S and determines a movement distance and a movement direction of the projection area of the image projected by the projector 34 using the method as explained in the first embodiment. The projected-image changing unit 22e of the processing unit 22 moves the projection area of the projector 34 based on the acquired movement distance and movement direction, to change the image projected to the projection area.

More specifically, the projected-image changing unit 22e controls the display so as to cause the projector 34 to project the information on the side of the movement direction when viewed from the original information for the currently projected image, of original image information for the map image PM, by a portion corresponding to the movement distance. The projected-image changing unit 22e controls the display so as to cause the projector 34 not to project the original information for the projected portion on the side of the opposite direction to the movement direction, of the currently projected image, by the portion corresponding to the movement distance. That is, the projected-image changing unit 22e causes the projector 34 to project the image, based on the information on the side of the movement direction when viewed from the original information for the currently projected image, to a position displaced on the side of the movement direction by the portion corresponding to the movement distance.

In the example illustrated in FIG. 13, the projected-image changing unit 22e moves the projection area of the projector 34 according to a timing at which the moving point S moves over the map image PM, to change a part of area in the map image PM projected by the projector 34. That is, the projected-image changing unit 22e provides controls for determining a position where the second image information and the second image are projected according a timing at which the moving point moves and causing the image projector to project the second image information. In this case, the projection area PA continuously moves as the moving point S moves. As a result, the image projected to the projection area PA is continuously changed to different portions of the map image PM. That is, the moving point S is projected so as to move over the map image PM together with the projection area PA in a state as if the moving point S is almost fixed to a predetermined position in the projection area PA. By doing in this manner, the map image PM around the moving object is continuously displayed, which makes it easy to understand how surrounding buildings and the like look during the movement.

Figure 14:
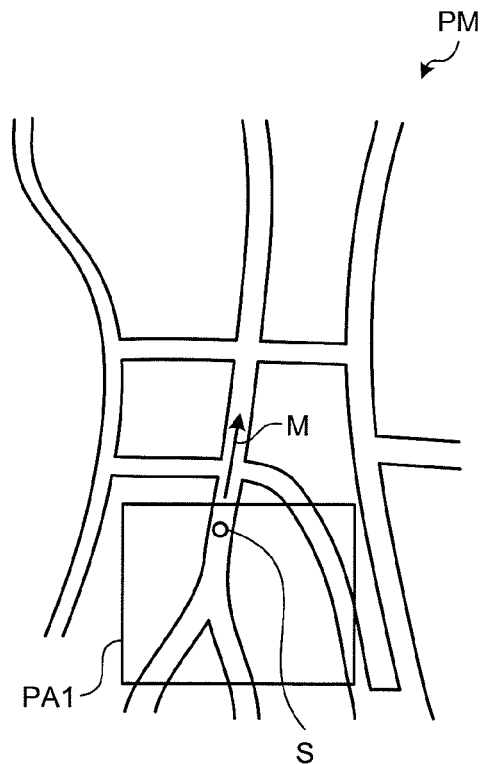
FIG. 14 is a diagram when an image projected by the projector built into the mobile electronic device is a map.
Figure 15:
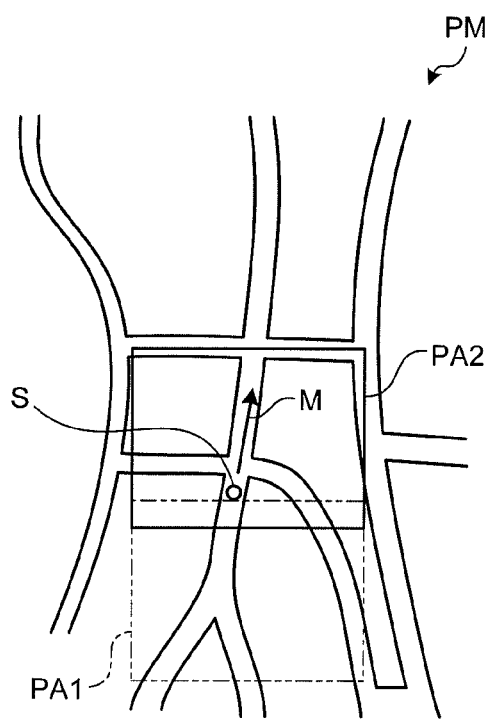
FIG. 15 is a diagram when an image projected by the projector built into the mobile electronic device is a map.

In the examples illustrated in FIG. 14 and FIG. 15, the projected-image changing unit 22e moves a projection area of the projector 34 at a timing at which the moving point S moves a predetermined distance, and changes a part of area in the map image PM projected by the projector 34. In FIG. 14, the moving point S moves over the map image PM within the projection area PA of the projector 34, and the projection area PA of the projector 34 does not move unless the moving point S moves a certain distance (for example, a predetermined number of pixels in the map image PM) over the map image PM. When the moving point S has moved the certain distance over the map image PM, the projection area moves from PA1 to PA2 as illustrated in FIG. 15. As a result, a part of area in the map image PM projected by the projector 34 is changed. By doing in the above manner, the map image PM intermittently changes, and this is useful for a case of finding out a position of a certain building, or the like.

In the present embodiment, a movement distance of the projection area between PA1 and PA2 is determined as a distance in which the moving point S moves at a timing at which the projection area is moved. A part of area in the map image PM projected by the projector 34 is changed at a timing at which the moving point S has moved a predetermined distance, however, when the distance between the projection area PA1 or PA2 and the moving point S becomes a predetermined threshold or less, then a part of area in the map image PM projected by the projector 34 may be changed. The configuration disclosed in the first embodiment can be arbitrarily applied hereinafter.

Second Embodiment

Figure 16:
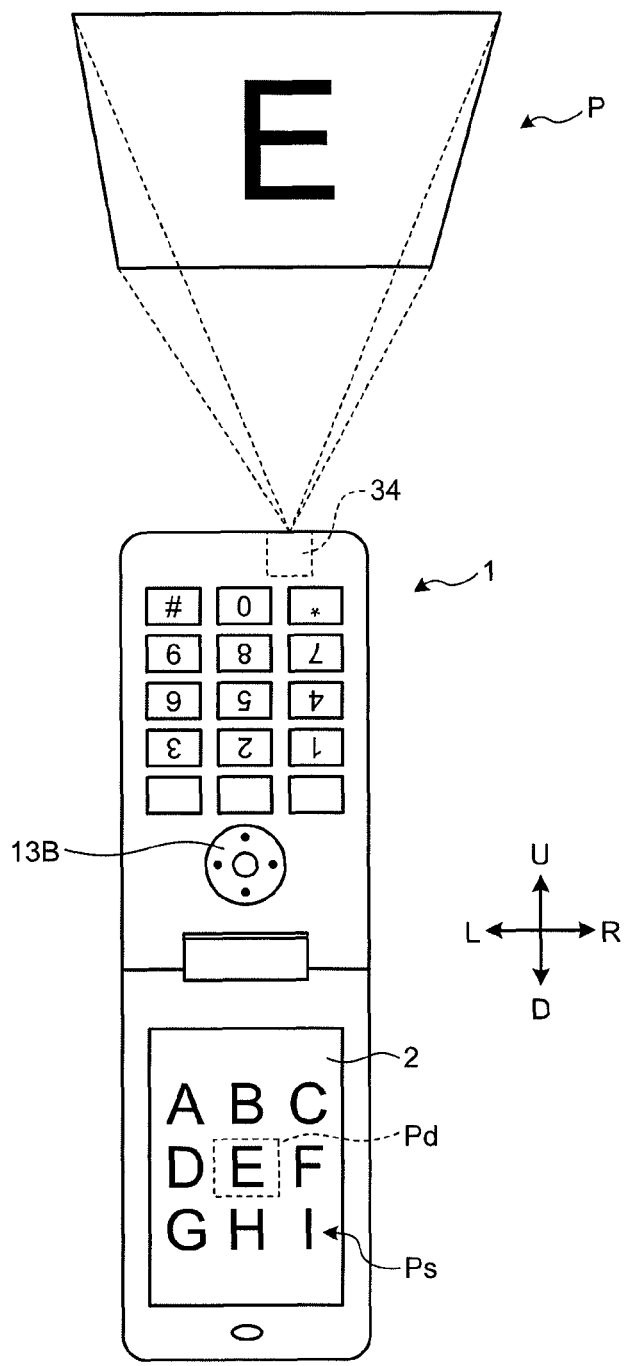
FIG. 16 is a diagram for explaining a method of changing an image projected by the projector provided in the mobile electronic device according to a second embodiment.
Figure 17:
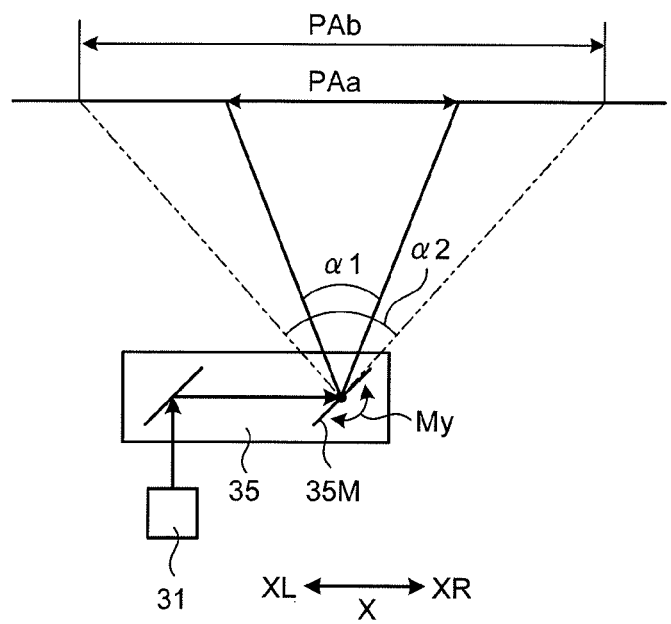
FIG. 17 is a diagram for explaining a method of changing an image projected by the projector provided in the mobile electronic device according to the second embodiment.
Figure 18:
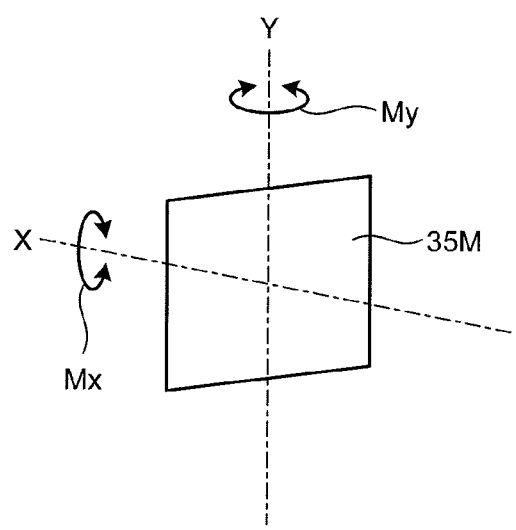
FIG. 18 is a schematic diagram illustrating a movement of a mirror that forms a drawing device provided in the mobile electronic device.

FIG. 16 and FIG. 17 are diagrams for explaining a method of changing an image projected by the projector provided in the mobile electronic device according to a second embodiment. FIG. 18 is a schematic diagram illustrating a movement of a mirror that forms a drawing device provided in the mobile electronic device. The present embodiment is almost the same as the first embodiment, however, there is a difference in a point that an input unit of the mobile electronic device generates change information for changing the image projected by the projector 34. The rest of the configuration is the same as that of the first embodiment.

When the projector 34 is used in the present embodiment as illustrated in FIG. 16, the projector 34 directs the light emitting portion of the projector 34 toward the image projection target to project the image P in a state of opening the mobile electronic device 1 illustrated in FIG. 1. In the example of FIG. 16, the projector 34 projects a partial area (projection target area) Pd, as the image P, of the original image PS displayed on the display 2 of the mobile electronic device 1.

At this time, the processing unit 22 illustrated in FIG. 3 uses the direction and decision key 13B as the input unit, moves the projection area of the projector 34 based on the input information, and changes the image projected by the projector 34. For example, when the user of the mobile electronic device 1 operates the direction and decision key 13B in a direction toward the image projection target (direction indicated by arrow U in FIG. 16), the projection area of the projector 34 moves upward in the original image PS displayed on the display 2, and a portion upper than the portion of the currently projected original image PS is displayed. When the user of the mobile electronic device 1 operates the direction and decision key 13B in a direction opposite to the direction toward the image projection target (direction indicated by arrow D in FIG. 16), the projection area of the projector 34 moves downward in the original image PS displayed on the display 2, and a portion lower than the portion of the currently projected original image PS is displayed.

Likewise, when the user of the mobile electronic device 1 operates the direction and decision key 13B rightward (direction indicated by arrow R in FIG. 16) with respect to the direction toward the image projection target, a portion rightward from a portion of the currently projected original image PS is displayed. When the user of the mobile electronic device 1 operates the direction and decision key 13B leftward (direction indicated by arrow L in FIG. 16) with respect to the direction toward the image projection target, a portion leftward from a portion of the currently projected original image PS is displayed.

In the present embodiment, the direction and decision key 13B is used as the input unit for generating change information for changing the image P projected by the projector 34. That is, the movement direction and the movement distance of the projection area of the projector 34 in the image projection target are generated based on the operation of the direction and decision key 13B. For example, the movement direction of the projection area is determined according to a direction in which the direction and decision key 13B is operated, and the movement distance of the projection area is determined according to a duration for which the direction and decision key 13B is operated.

The movement distance of the projection area is determined as the number of pixels along which the projection target area Pd moves over the original image PS or as the number of pixels of the original image PS along which the display area of the display 2 is moved according to the operation of the direction and decision key 13B. The movement of the projection target area Pd and the movement of the original image PS over the display area of the display 2 are caused by the operation of the direction and decision key 13B, and as a result, the movement distance of the projection area is generated by the direction and decision key 13B.

In the present embodiment, the projection area of the projector 34 is changed by changing an operation range of a mirror 35M that forms the drawing device 35 as illustrated in FIG. 17. The mirror 35M changes an angle of a laser light emitted from the visible-light irradiation device 31 and sways around the X axis and the Y axis (directions indicated by arrows Mx and Yx) as illustrated in FIG. 18, to scan the laser light on the image projection target. FIG. 17 represents a state where swaying of the mirror 35M around Y axis (direction indicated by arrow My in FIG. 17) causes the laser light to scan in the X-axis direction. When the angle at which the mirror 35M sways is changed from $\alpha 1$ to $\alpha 2$ ($\alpha 1 < \alpha 2$), the scan range of the laser light on the image projection target is enlarged from PAa to PAb.

In the present embodiment, the projected-image changing unit 22e in FIG. 3 controls the size of the angle and the range in which the mirror 35M sways, to thereby change the projection area of the projector 34. For example, when the mirror 35M is swayed at an angle closer to an angle parallel to the incident direction of the laser light while the angle of sway of the mirror 35M is kept to $\alpha 1$, the projection area of the projector 34 moves in a direction indicated by arrow XR in FIG. 17. When the mirror 35M is swayed at an angle closer to a right angle to the incident direction of the laser light while the angle of sway of the mirror 35M is kept to $\alpha 1$, the projection area of the projector 34 moves in a direction indicated by arrow XL in FIG. 17. In this way, the projected-image changing unit 22e changes the projection area of the projector 34.

In the present embodiment, the direction and decision key 13B is used as the input unit to change the projection area of the projector 34, and therefore, for example, when the projection area is changed by the mobile electronic device 1 held by hand and if the change exceeds a range of motion of the hand, the projection area of the projector 34 can be changed by the direction and decision key 13B. With this process, the operational flexibility of the projector 34 in the mobile electronic device 1 is further improved. Thus, in the present embodiment, the projection area of the projector 34 is changed based on at least either one of the direction and decision key 13B and the movement of the mobile electronic device 1, so that the image projected by the projector 34 can be changed. The configuration disclosed in the second embodiment can be arbitrarily applied hereinafter.

Third Embodiment

Figure 19:
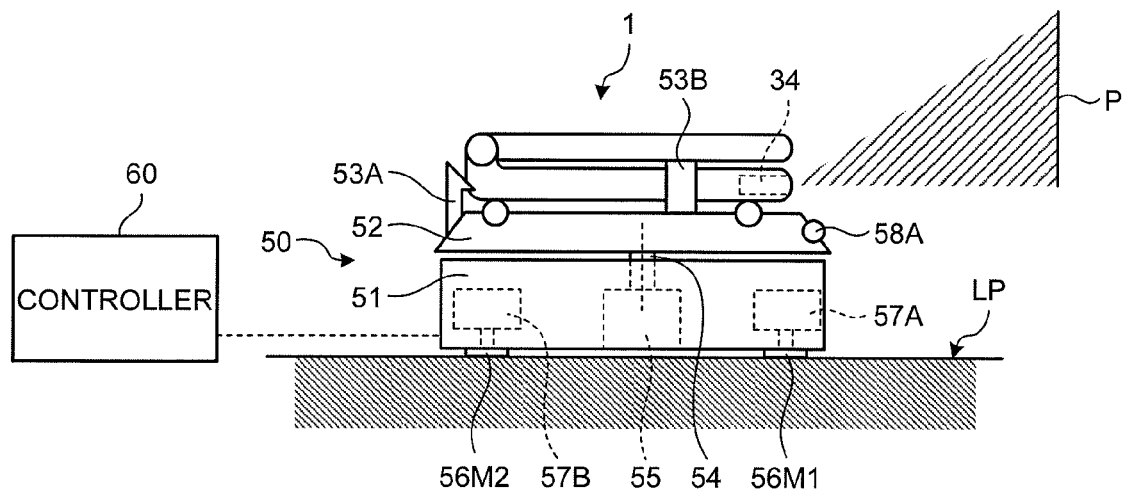
FIG. 19 is a diagram illustrating how a mobile electronic device according to a third embodiment is mounted on a mount base for the mobile electronic device.
Figure 20:
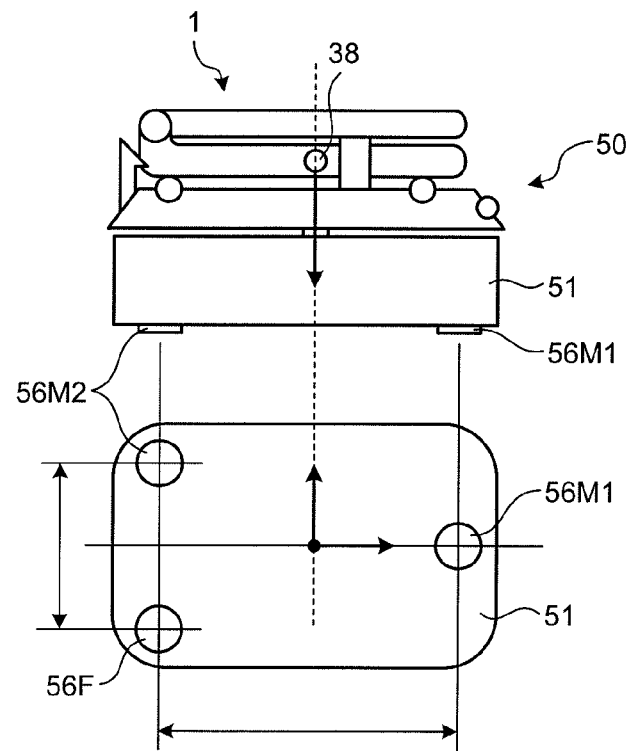
FIG. 20 is a diagram illustrating how the mobile electronic device according to the third embodiment is mounted on the mount base for the mobile electronic device.
Figure 21:
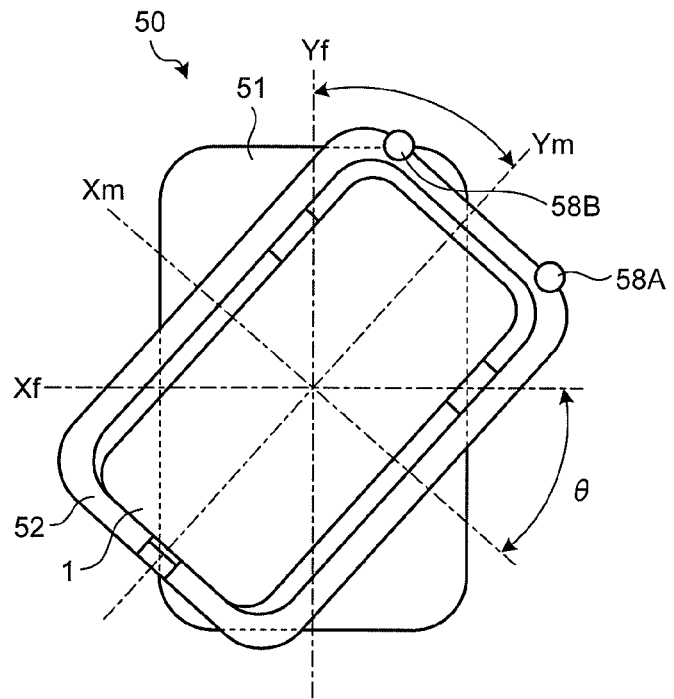
FIG. 21 is a top view illustrating how the mobile electronic device according to the third embodiment is mounted on the mount base for the mobile electronic device.
Figure 22:
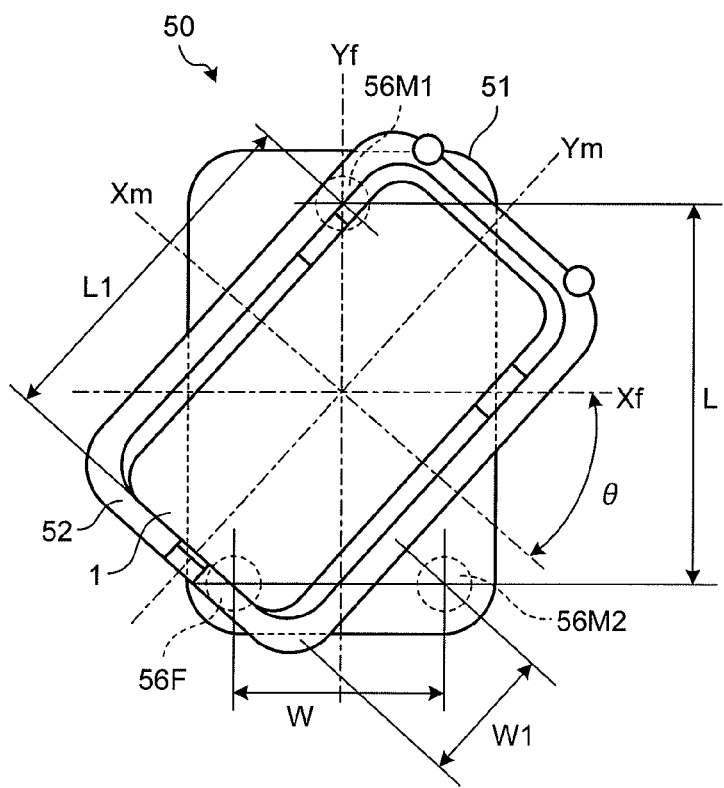
FIG. 22 is a top view illustrating how the mobile electronic device according to the third embodiment is mounted on the mount base for the mobile electronic device.
Figure 23:
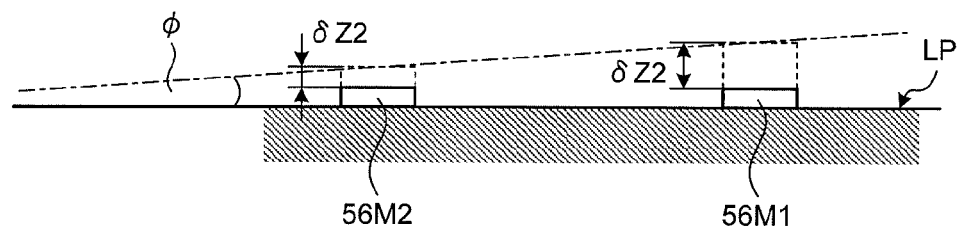
FIG. 23 is a diagram for explaining a method of adjusting a height of the mount base for the mobile electronic device according to the third embodiment.

FIG. 19 and FIG. 20 are diagrams illustrating how a mobile electronic device according to a third embodiment is mounted on a mount base for the mobile electronic device. FIG. 21 and FIG. 22 are top views illustrating how the mobile electronic device according to the third embodiment is mounted on the mount base for the mobile electronic device. FIG. 23 is a diagram for explaining a method of adjusting a height of the mount base for the mobile electronic device according to the third embodiment. The present embodiment is configured to use a projector of the mobile electronic device in a state where the mobile electronic device is mounted on the mount base (device mount base) for the mobile electronic device.

A device mount base 50 includes a base 51 and a stage 52. As illustrated in FIG. 20, two movable legs 56M1 and 56M2 and one fixed leg 56F are provided on the bottom of the base 51, and these legs are arranged in triangle vertices, respectively. The two movable legs 56M1 and 56M2 are driven by separately provided height-adjustment actuators 57A and 57B, respectively. This enables the lengths of the two movable legs 56M1 and 56M2 to be separately changed, thus adjusting a distance between the device mount base 50 and a mount surface LP of the device mount base 50.

Mounted on the base 51 is a motor 55 for rotating the stage 52. For example, a stepping motor can be used as the motor 55. The stepping motor enables a rotation angle of the motor 55 to be obtained, and thus an angle between the base 51 and the stage 52 is easy to be checked. The motor 55 and the stage 52 are coupled to each other by a rotating shaft 54, and rotation of the motor 55 causes the rotating shaft 54 to rotate, so that the stage 52 rotates around the center of the shaft. Fixed to the stage 52 are a plurality of holding pawls 53A and 53B for holding the mobile electronic device 1, and the mobile electronic device 1 mounted on the stage 52 is held on the stage 52 with the holding pawls 53A and 53B.

As illustrated in FIG. 19, in the present embodiment, the device mount base 50 includes a controller 60. The controller 60 controls the lengths of the two movable legs 56M1 and 56M2, the rotation angle of the stage 52, and the like. The present embodiment is configured so that the controller 60 and the mobile electronic device 1 mounted on the device mount base 50 can mutually communicate with each other. Communication means of the two is, for example, infrared communication. With such a configuration as above, the processing unit of the mobile electronic device 1 can use information for the device mount base 50 acquired by the controller 60 (for example, the rotation angle of the stage 52, and the lengths of the movable legs 56M1 and 56M2) for the control of the projector 34. In addition, the controller 60 can use information acquired by sensor(s) included in the mobile electronic device 1 (for example, information detected by the acceleration sensor 38 and the distance sensor 36 illustrated in FIG. 3) for the control of the device mount base 50.

As illustrated in FIG. 21, the stage 52 includes two optical sensors (optical detectors) 58A and 58B. The optical sensors 58A and 58B are arranged so that, when the mobile electronic device 1 is mounted on the stage 52, the optical sensors 58A and 58B are located on the light emission side of the projector 34 built into the mobile electronic device 1. Moreover, the optical sensors 58A and 58B are arranged at a predetermined interval along a direction orthogonal to the optical axis of the projector 34. The optical sensors 58A and 58B measure light amounts of reflected lights when the projector 34 projects a white image to the image projection target.

For example, the controller 60 rotates the motor 55 so that the light amounts of the reflected lights detected by the two optical sensors 58A and 58B become equal to each other at both the optical sensors 58A and 58B. Such a process as above enables the image projection plane of the image projection target and the projector 34 of the mobile electronic device 1 to face each other. The mobile electronic device 1 acquires an angle between the base 51 and the stage 52 when the projector 34 and the image projection plane of the image projection target face each other (for example, an angle formed by an axis Yf of the base 51 and an axis Ym of the stage 52 illustrated in FIG. 21) from the rotation angle of the motor 55, or the like, and thereby the mobile electronic device 1 detects an inclination of the projector 34 with respect to the image projection plane of the image projection target.

In the present embodiment, in order to mount the mobile electronic device 1 on the device mount base 50 and use the projector 34, an attitude of the mobile electronic device 1 mounted on the device mount base 50 or of the device mount base 50 is measured by the acceleration sensor 38 provided in the mobile electronic device 1. The acceleration sensor 38 may be provided inside the device mount base 50. As explained in the first embodiment, the acceleration sensor 38 is the triaxial acceleration sensor, and the axes (X axis, Y axis, ad Z axis) thereof are made to match the axes of the mobile electronic device 1 mounted on the device mount base 50 or of the device mount base 50, respectively. With such a configuration as above, the acceleration sensor 38 detects the inclination of the mobile electronic device 1 with respect to the horizontal direction. Here, because the acceleration sensor 38, even as an existing product, has a sensitivity capable of detecting about 3 mG, about 0.2 degree can be ensured as the angle that can be detected by the acceleration sensor 38.

When the acceleration sensor 38 detects the inclination of the mobile electronic device 1 with respect to the horizontal direction, the controller 60 adjusts the lengths of the two movable legs 56M1 and 56M2 provided on the bottom of the base 51, so that the inclined angle of the mobile electronic device 1 with respect to the horizontal direction becomes 0 degree. For example, as illustrated in FIG. 22, a case, in which a width between the movable leg 56M2 and the fixed leg 56F is set to W=40 mm, a length between the movable leg 56M1 and the movable leg 56M2 in a direction parallel to Yf axis of the base 51 is set to L=80 mm, and stepping motors are used as the height-adjustment actuators 57A and 57B, is assumed. In this case, if the stepping motors used for the height-adjustment actuators 57A and 57B are capable of changing the lengths of the movable legs 56M1 and 56M2 at 0.05 mm intervals by one step, the mobile electronic device 1 can be horizontally disposed.

After the mobile electronic device 1 is mounted on the device mount base 50, first, the controller 60 uses the communication function to acquire information for the attitude of the mobile electronic device 1 obtained from the acceleration sensor 38 provided in the mobile electronic device 1. Then, the controller 60 drives the height-adjustment actuator 57B to adjust the length of the movable leg 56M2 based on the acquired information for the attitude. The controller 60 adjusts the horizontality in the Xf-axis direction of the device mount base 50 through this operation. Next, the controller 60 drives the height-adjustment actuator 57A to adjust the length of the movable leg 56M1. The controller 60 adjusts the horizontality in the Yf-axis direction of the device mount base 50 through this operation. The adjustments may be performed in reverse order. Here, the Xf axis and the Yf axis are axes of the base 51 forming the device mount base 50.

In the present embodiment, because the controller 60 adjusts the lengths of the movable legs 56M1 and 56M2 of the device mount base 50, an elevation angle (angle of an optical axis Al with respect to the mount surface LP illustrated in FIG. 23) $\phi$ of the optical axis of the projector 34 provided in the mobile electronic device 1 mounted on the device mount base 50 can be adjusted. The optical axis Al of the projector 34 when the mobile electronic device 1 is mounted on the device mount base 50 is parallel to Ym axis of the stage 52.

The case of changing the optical axis Al is, for example, a case of changing an image projected by the projector 34. The case of changing the optical axis Al includes, for example, a case in which, in succession to the currently projected image P1 being a portion of the original image PS illustrated in FIG.

6, an image corresponding to any other portion different from the image P1 (e.g., B or H in the original image of FIG. 6) is projected. In this case, the attitude/position computing unit 22d of the mobile electronic device 1 in FIG. 3 calculates the elevation angle φ of the optical axis Al of the projector 34 based on at least one of the change information (movement direction and the size of the projection area of the projector 34), the distance between the projector 34 and the image projection target, and the like. The controller 60 acquires the elevation angle φ determined by the attitude/position computing unit 22d of the mobile electronic device 1 using the communication function, and controls the height-adjustment actuators 57A and 57B to adjust the lengths of the movable legs 56M1 and 56M2 so as to obtain the elevation angle φ.

The elevation angle φ can be changed in such a manner that the controller 60 separately adjusts the length of the movable leg 56M1 and the length of the movable leg 56M2. An adjustment amount of the movable leg 56M1 required for obtaining the elevation angle φ is set to δZ1 and an adjustment amount of the movable leg 56M2 is set to δZ2. As illustrated in FIG. 22, it is assumed that the Xf axis of the base 51 and Xm axis of the stage 52 of the device mount base 50 are inclined to each other by θ. In this case, δZ1 is determined by Equation (8) and δZ2 is determined by Equation (9):

$$\delta Z1 = L1 \times \tan\phi = (W/2 \times \sin\theta + L \times \cos\theta) \times \tan\phi, \quad (8)$$

$$\delta Z2 = W1 \times \tan\phi = W \times \sin\theta \times \tan\phi. \quad (9)$$

The controller 60 determines δZ1 and δZ2 from Equation (8) and Equation (9) respectively so as to become the elevation angle φ determined by the attitude/position computing unit 22d. The controller 60 controls the height-adjustment actuators 57A and 57B so as to become the determined δZ1 and δZ2, and adjusts the lengths of the movable legs 56M1 and 56M2. This operation enables the elevation angle φ of the optical axis Al of the projector 34 to be adjusted. The processing unit 22 of the mobile electronic device 1 may control the operations of the height-adjustment actuators 57A and 57B using the communication function.

Figure 24:
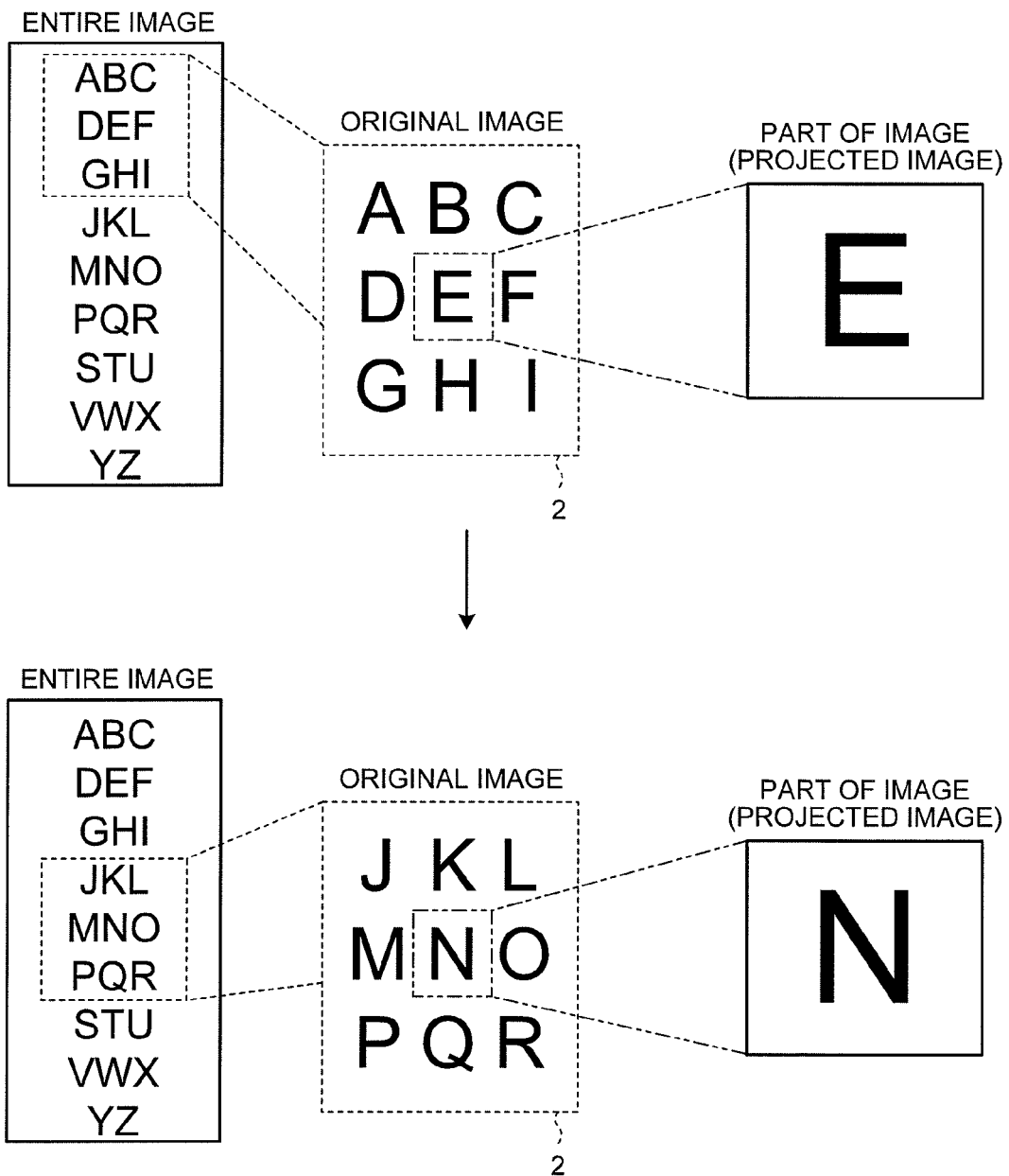
FIG. 24 is a diagram for explaining a modification example of the method for changing an image projected by the projector provided in the mobile electronic device.

FIG. 24 is a diagram for explaining a modification example of the method for changing an image projected by the projector provided in the mobile electronic device. In the explanation, the case of projecting a part of image of the original image is mainly described, however, a range of the original image may be changed or processed. For example, in FIG. 16, the original image is an image where "A to I" appear, however, the original image (the image on the display 2) "A to I" may be a part of an entire image with "A to Z" described thereon. Instead of the original image "A to I" displayed on the display 2, a new image "J to R" may be set as the original image as illustrated in FIG. 24.

During the change and the process of the original image, for example, the original image may be displayed on the display 2. For example, when the original image "A to I" is displayed on the display 2, by reducing the size of the original image "A to I" or moving the display position thereof (scrolling the screen), out of the entire image, the range is enlarged so that "A to R" may be displayed or the range is changed so that "J to R" may be displayed, and a new range displayed on the display 2 may be set as the original image.

This series of processes may be performed by the processing unit 22 of the mobile electronic device 1. For example, the processing unit 22 prompts the user to specify a range as to up to which range of the entire image is set as an original image. When the user specifies a preferred range of the whole of the image, the processing unit 22 performs the process of checking with the user whether the specified range is set as the original image. After the checking process, the processing unit 22 sets the image whose range is newly specified, as a new original image, and displays the image on the display 2. It goes without saying that the whole of the entire image may be set as the original image. Moreover, the initial setting in which the entire image is always set as the original image may be performed.

INDUSTRIAL APPLICABILITY

As explained above, the mobile electronic device according to the present invention is useful for those provided with a device, such as a projector, capable of projecting an image.

The invention claimed is:

1. A mobile electronic device, comprising:
   a housing;
   an image projector provided on the housing and configured to project for projecting a portion of an original image to a projection area;
   a processing unit;
   a display unit, wherein the processing unit is configured to cause the display unit to display a base image that is the original image or the portion of the original image; and
   a specifying unit configured to allow a user to specify the base image from the original image;
   wherein the processing unit is further configured to cause the image projector to change an image projected to the projection area from a first image corresponding to a first portion of the base image to a second image corresponding to a second portion of the base image according to change information for changing the image projected by the image projector.

2. The mobile electronic device according to claim 1, wherein the change information is information on a movement of the image projector.

3. The mobile electronic device according to claim 2, further comprising a movement detector configured to detect a movement distance and a movement direction of the image projector as the change information, wherein
   the processing unit is configured to
      determine the second portion as a portion displaced in the movement direction by a distance corresponding to the movement distance from the first portion, and
      cause the image projector to move the projection area to a position displaced in the movement direction by a distance corresponding to the movement distance from a current position of the projection area.

4. The mobile electronic device according to claim 3, wherein the movement detector is an acceleration sensor.

5. The mobile electronic device according to claim 1, wherein the processing unit is configured to cause the image projector to further project a moving point movable with respect to the portion of the originalbase image projected by the image projector.

6. The mobile electronic device according to claim 5, wherein
   the change information is information on a movement direction and a movement distance of the moving point, and
   the processing unit is configured to determine the second portion as a portion displaced in the movement direction by a distance corresponding to the movement distance from the first portion.

7. The mobile electronic device according to claim 6, wherein the processing unit is configured to cause the image projector to change the portion to be projected to the projection area in synchronization with a movement of the moving point.

8. The mobile electronic device according to claim 6, wherein the processing unit is configured to cause the image projector to change the portion to be projected to the projection area according to the movement distance of the moving point.

9. The mobile electronic device according to claim 1, further comprising an input unit configured to generate, as the change information, information on a movement direction and a movement distance of the portion projected by the image projector.

10. The mobile electronic device according to claim 1, wherein, the processing unit is configured to cause, when causing the image projector to project the first image or the second image, the display unit to display the base image.

11. A mobile electronic device, comprising:
a housing;
an image projector provided on the housing for projecting a portion of an original image to a projection area; and
a processing unit for causing the image projector to change an image projected to the projection area from a first image corresponding to a first portion of the original image to a second image corresponding to a second portion of the original image according to change information for changing the image projected by the image projector,
wherein, the processing unit is configured to cause, when causing the image projector to project the first image or the second image, the display unit to display the original image, and
wherein the processing unit is configured to cause the image projector to further project a moving point movable with respect to the portion of the original image and cause the display unit to further display the moving point.

12. A mobile electronic device, comprising:
a housing;
an image projector provided on the housing for projecting a portion of an original image to a projection area;
a processing unit for causing the image projector to change an image projected to the projection area from a first image corresponding to a first portion of the original image to a second image corresponding to a second portion of the original image according to change information for changing the image projected by the image projector;
a stage for mounting the housing;
a base for mounting the stage;
a rotating shaft for rotating the stage with respect to the base; and
a plurality of optical sensors for detecting reflected light from the projection area when the image projector projects an image,
wherein the processing unit is configured to control the rotating shaft in such a way that the image projector and the projection area face each other, based on the reflected light detected by the plurality of optical sensors.

13. The mobile electronic device according to claim 12, further comprising:
an acceleration sensor for detecting an attitude of the mobile electronic device; and
a movable leg provided on the bottom of the base, wherein the processing unit is configured to control the length of the movable leg in such a way that the mobile electronic device is horizontally disposed, based on the attitude detected by the acceleration sensor.

14. The mobile electronic device according to claim 13, wherein the processing unit is configured to control the length of the movable leg in order to adjust an elevation angle of an optical axis of the image projector.

15. The mobile electronic device according to claim 10, wherein the processing unit is configured to cause the image projector to further project a moving point movable with respect to the portion of the base image and cause the display unit to further display the moving point.

16. The mobile electronic device according to claim 1, further comprising:
a stage for mounting the housing;
a base for mounting the stage;
a rotating shaft for rotating the stage with respect to the base; and
a plurality of optical sensors for detecting reflected light from the projection area when the image projector projects an image,
wherein the processing unit is configured to control the rotating shaft in such a way that the image projector and the projection area face each other, based on the reflected light detected by the plurality of optical sensors.

17. The mobile electronic device according to claim 16, further comprising:
an acceleration sensor for detecting an attitude of the mobile electronic device; and
a movable leg provided on the bottom of the base, wherein the processing unit is configured to control the length of the movable leg in such a way that the mobile electronic device is horizontally disposed, based on the attitude detected by the acceleration sensor.

18. The mobile electronic device according to claim 17, wherein the processing unit is configured to control the length of the movable leg in order to adjust an elevation angle of an optical axis of the image projector.

19. The mobile electronic device according to claim 1, wherein the base image is initialized by the original image.

* * * * *